US008905682B2

(12) United States Patent
Harif

(10) Patent No.: US 8,905,682 B2
(45) Date of Patent: Dec. 9, 2014

(54) MULTI-EDGE CUTTING HEAD AND AN INSERT USED THEREIN

(75) Inventor: Gershon Harif, Ramat Gan (IL)

(73) Assignee: Simatate Ltd., Holon (IL)

(*) Notice: Subject to any disclaimer, the term of this patent is extended or adjusted under 35 U.S.C. 154(b) by 514 days.

(21) Appl. No.: 13/148,885

(22) PCT Filed: Feb. 11, 2010

(86) PCT No.: PCT/IL2010/000122
§ 371 (c)(1),
(2), (4) Date: Aug. 10, 2011

(87) PCT Pub. No.: WO2010/092574
PCT Pub. Date: Aug. 19, 2010

(65) Prior Publication Data
US 2011/0311327 A1     Dec. 22, 2011

Related U.S. Application Data

(60) Provisional application No. 61/202,252, filed on Feb. 11, 2009.

(51) Int. Cl.
*B23C 5/08*     (2006.01)
*B23C 5/22*     (2006.01)
*B23C 5/10*     (2006.01)

(52) U.S. Cl.
CPC ............... *B23C 5/109* (2013.01); *B23C 5/2221* (2013.01); *B23C 2210/03* (2013.01); *B23C 2200/367* (2013.01); *B23C 2210/02* (2013.01); *B23C 2270/16* (2013.01)
USPC .............................................. 407/43; 407/61

(58) Field of Classification Search
USPC .............................. 407/53, 43, 56, 61, 62, 63
See application file for complete search history.

(56) References Cited

U.S. PATENT DOCUMENTS 1,119,528 A * 12/1914 Neiman ........................ 408/197
1,385,750 A *  7/1921 Pollock ........................... 407/54
(Continued)

FOREIGN PATENT DOCUMENTS

| DE | 102006008887 A1 * | 8/2007 |
| DE | 102007013153 | 9/2008 |

(Continued)

OTHER PUBLICATIONS

International Search Report for International Application No. PCT/IL2010/000122 dated Jul. 22, 2010.

(Continued)

*Primary Examiner* — Daniel Howell
*Assistant Examiner* — Nicole N Ramos
(74) *Attorney, Agent, or Firm* — Dorsey & Whitney LLP

(57) ABSTRACT

A cutting portion of an integral cutting tool or of a cutting insert adapted for mounting onto a cutting tool holder to form a cutting tool, which comprises a plurality n of cutting edges. The cutting portion extends along a cutting path about a central axis. The cutting path (CP) passes through a point of each of the cutting edges which is at a maximal radial space R from the central axis, such that (formula I), where D=2R and θ is the angular extension of the cutting path about the central axis (X). At any given point along the cutting portion, (formula II), where L is one of the following: i. the extension of the cutting portion in a direction perpendicular to the cutting path; and ii. the extension of the cutting edges in a direction perpendicular to the cutting path.

16 Claims, 34 Drawing Sheets

(56) References Cited

U.S. PATENT DOCUMENTS

| | | | | |
|---|---|---|---|---|
| 1,408,947 A * | 3/1922 | Johnson | | 408/201 |
| 1,715,097 A * | 5/1929 | Redinger | | 279/42 |
| 1,898,732 A * | 2/1933 | Kröhne | | 407/31 |
| 2,369,273 A * | 2/1945 | Bakewell | | 408/222 |
| 2,788,568 A * | 4/1957 | Pinto | | 407/63 |
| 3,283,663 A * | 11/1966 | Davis | | 409/181 |
| 3,704,517 A * | 12/1972 | Deterling | | 408/26 |
| 3,766,618 A * | 10/1973 | Janninck | | 407/26 |
| 4,083,643 A | 4/1978 | Parone | | |
| 4,464,086 A * | 8/1984 | Bentjens | | 407/25 |
| 4,991,986 A * | 2/1991 | Wiederkehr | | 407/53 |
| 6,431,801 B2 * | 8/2002 | Vasudeva et al. | | 408/211 |
| 7,150,590 B2 * | 12/2006 | Schafer et al. | | 409/234 |
| 7,611,313 B2 * | 11/2009 | Hyatt et al. | | 409/132 |
| 2006/0104736 A1 | 5/2006 | Satran et al. | | |
| 2006/0104739 A1 | 5/2006 | Hamper | | |
| 2007/0081872 A1* | 4/2007 | Blomstedt et al. | | 409/234 |
| 2008/0063482 A1 | 3/2008 | Engfer | | |
| 2010/0104382 A1 | 4/2010 | Heinloth et al. | | |

FOREIGN PATENT DOCUMENTS

| | | |
|---|---|---|
| DE | 102007049057 A1 * | 4/2009 |
| EP | 742065 A2 * | 11/1996 |
| EP | 1897642 | 3/2008 |
| FR | 1299044 | 7/1962 |
| GB | 869168 | 5/1961 |
| GB | 1437428 | 5/1976 |
| JP | 9300119 | 11/1997 |
| SU | 1701439 A1 * | 12/1991 |
| WO | WO 2008114259 | 9/2008 |
| WO | WO 2008149371 | 12/2008 |

OTHER PUBLICATIONS

Gim, et al. "Optimisation of Face-Milling Cutters by Use of a Computer-Aided Milling-System Simulator (CAMSS)" The International Journal of Advanced Manufacturing Technology, 1991, pp. 263-284.

* cited by examiner

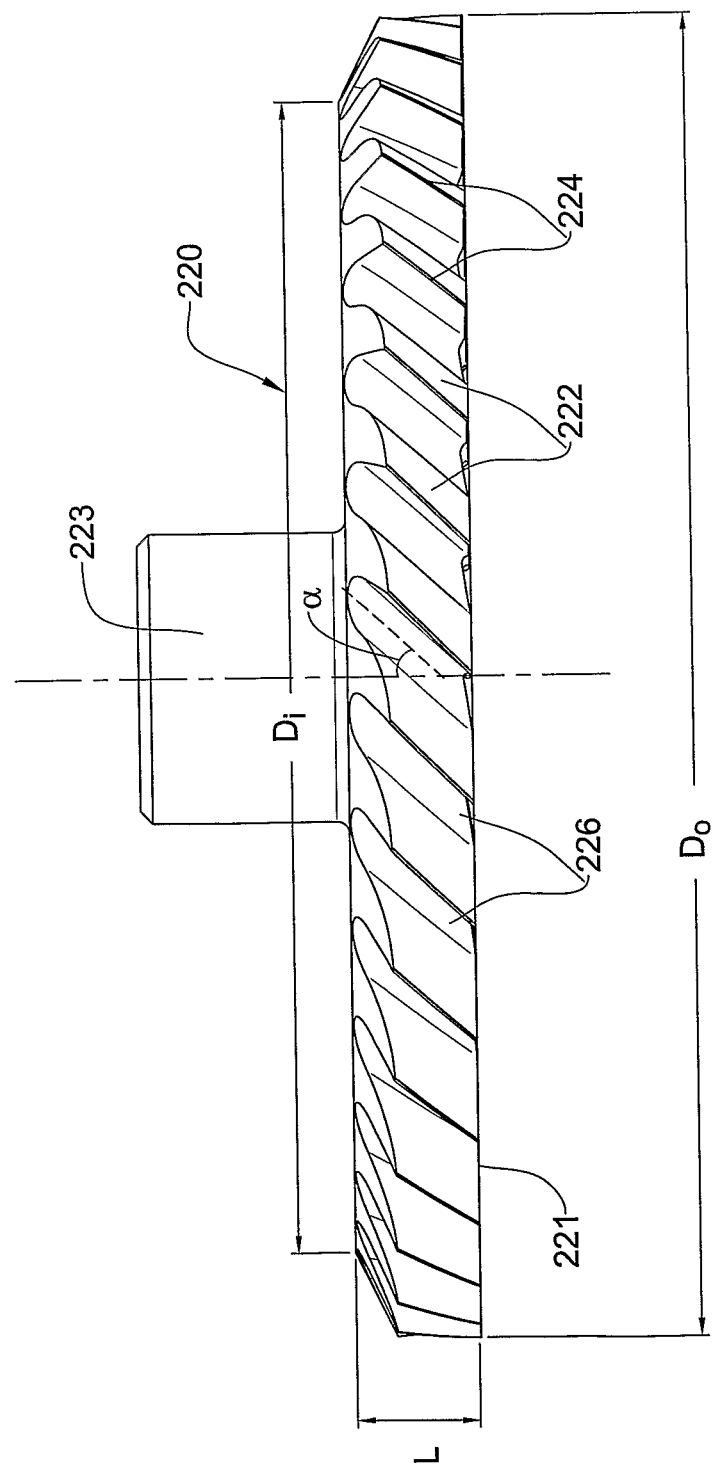

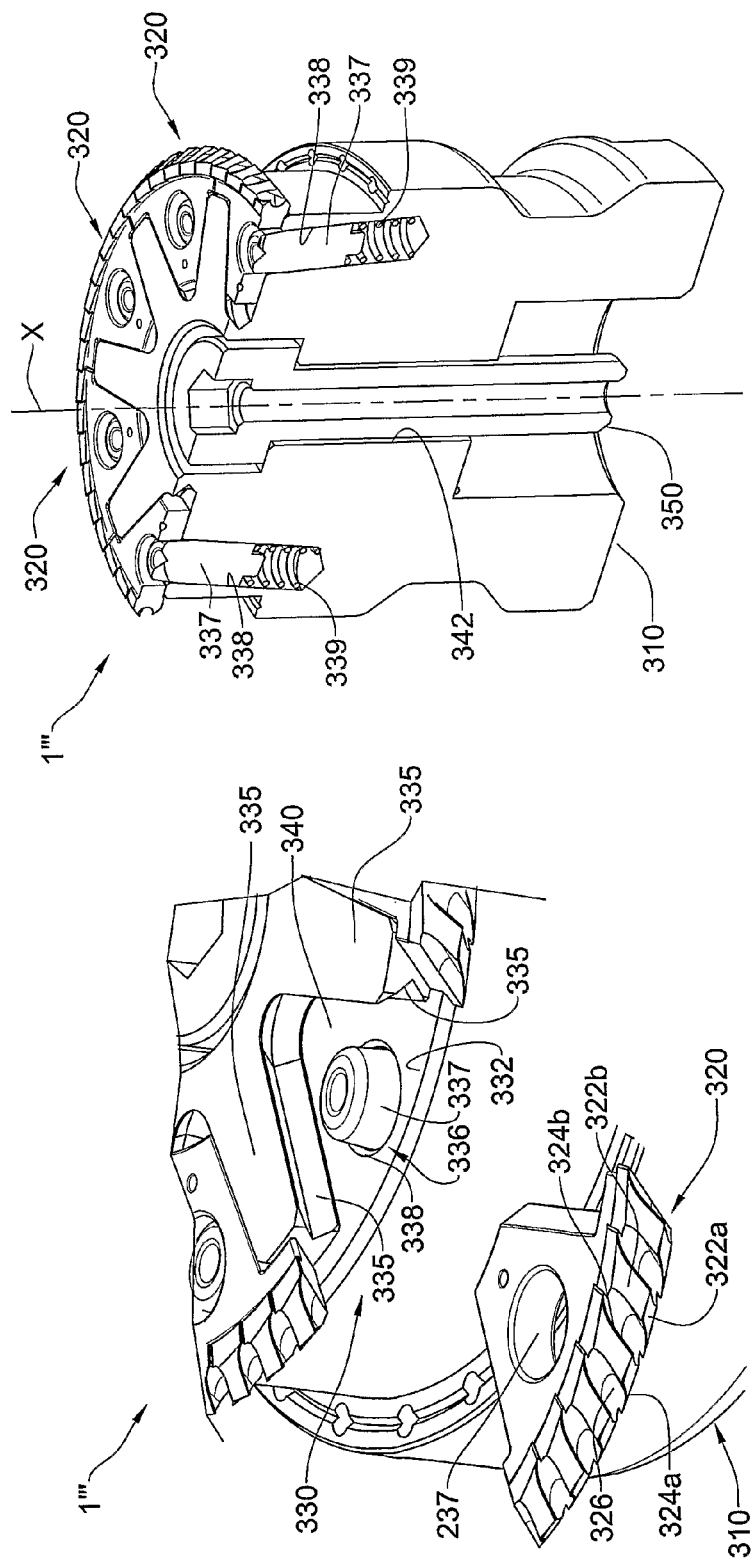

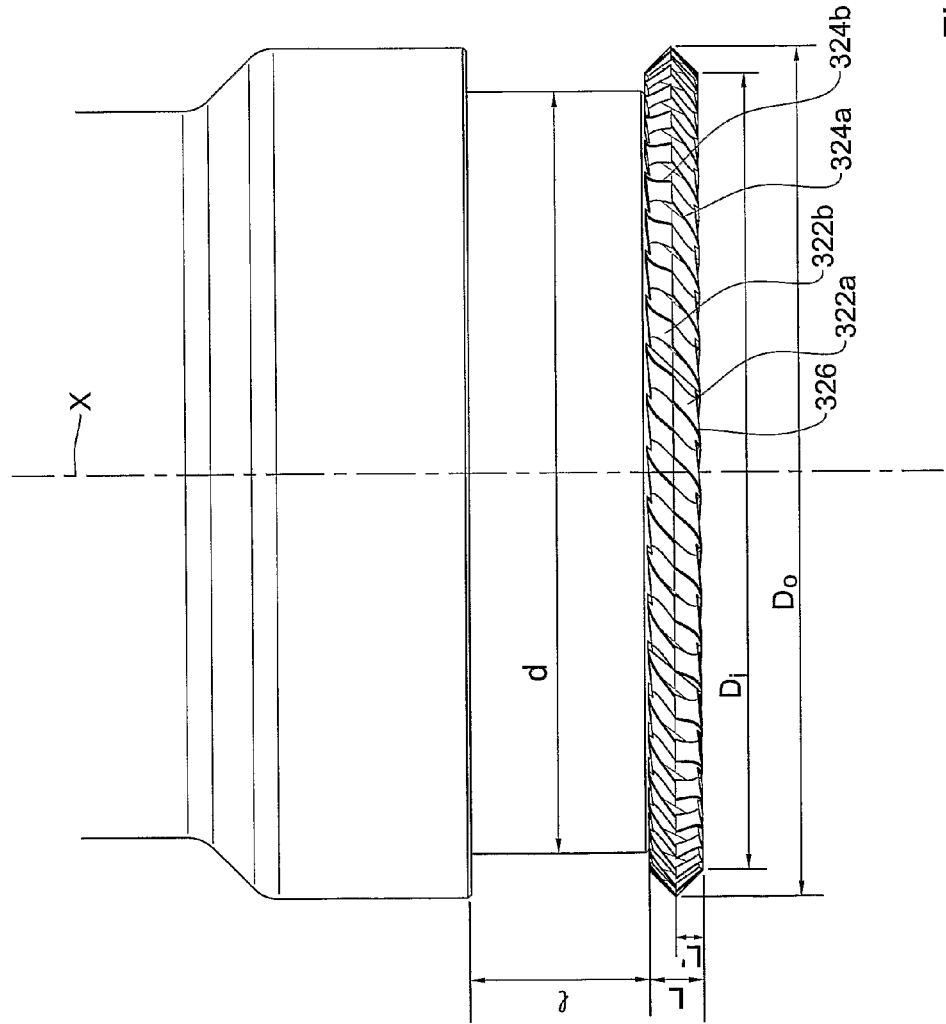

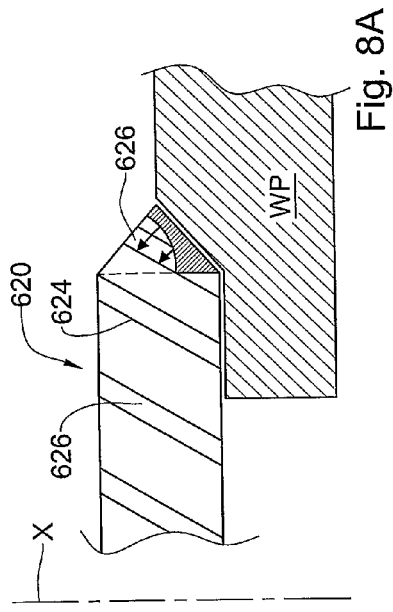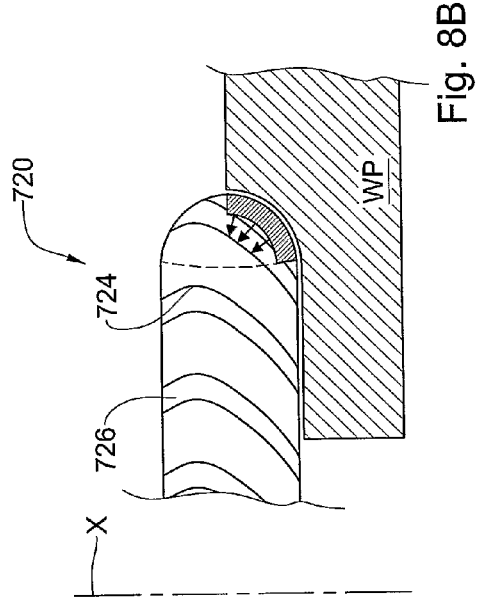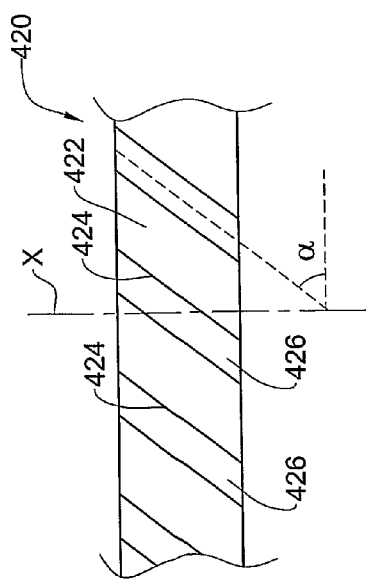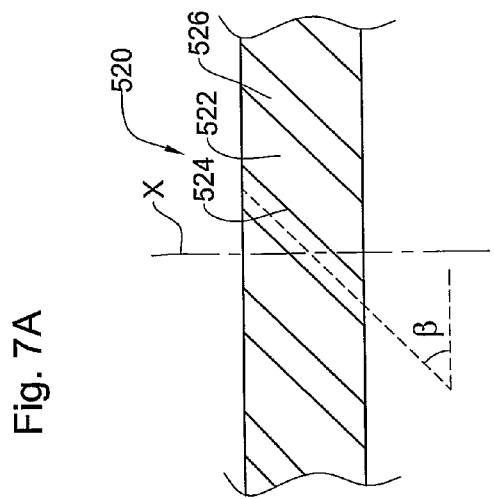

MULTI-EDGE CUTTING HEAD AND AN INSERT USED THEREIN

CROSS-REFERENCE TO RELATED APPLICATIONS

This application is a U.S. Nationalization of PCT International Application No. PCT/IL2010/000122 filed 11 Feb. 2010, entitled "MULTI-EDGE CUTTING HEAD AND AN INSERT USED THEREIN," which claims priority to U.S. Provisional Patent Application No. 61/202,252 filed 11 Feb. 2009, the contents of both of the foregoing applications are incorporated herein, in their entirety, by this reference.

FIELD OF THE INVENTION

This invention relates to cutting heads, in particular, cutting heads adapted for removing a layer of material from the surface of a workpiece.

BACKGROUND OF THE INVENTION

Cutting tools are used for removing material from a workpiece in order to manufacture therefrom a desired final element. There exists in common practice a great variety of operations for the removal of material, for each of which, a specific tool is designed, which may be in the form of a single body or in the form of a tool holder with one or more replaceable cutting inserts mounted thereon. Examples of such operations are drilling, milling, turning, boring etc.

A majority of cutting tools or cutting inserts are formed with a cutting edge adapted to come in contact with the workpiece, within a cutting zone, so as to remove material therefrom during a cutting operation, the removed material being in the form of a chip, and the process of forming chips being known as chipping.

During a cutting operation there is usually provided a linear displacement of the cutting tool relative to the workpiece, referred to as 'feed' and either rotation of the cutting tool about its central axis with the workpiece being stationary, such as e.g. in milling and drilling operations, or rotation of the workpiece about its central axis with the tool moving only linearly such as e.g. in turning, slotting, parting and the like.

Chips must be evacuated continuously during chipping and any congestion may rapidly lead to high loads, overheating, quick wear and consequent break-down, failure or malfunction of the cutting tool or cutting insert.

During a cutting operation, the amount of material to be removed per time unit by a given cutting tool from a given workpiece, and particularly, the thickness of the chip removed, depends on a number of parameters including the speed of rotation $V_R$ of the cutting tool relative to the workpiece and the feed F.

On the other hand, the above parameters have a drastic influence on loads exerted on the cutting tool during chipping. The loads exerted on the cutting tool may be so high as to cause damage thereto, rendering it useless. On top of this, friction of the cutting tool with the workpiece causes heating of the former and the latter at the cutting zone, due to which extensive cooling, usually by means of a cooling liquid, is normally required. To avoid undesirable cutting conditions, the feed F and rotation speed $V_R$ are thus limited, and so is, as a consequence, the power used.

SUMMARY OF THE INVENTION

The subject matter of the present application calls for of an integral cutting tool or a cutting insert for a cutting tool holder which have a cutting portion which comprises a plurality n of cutting edges. The cutting edges may be arranged along a cutting path, the term 'cutting path' being defined herein as a curve passing through a set of points, each located on a separate cutting edge, at a location along said cutting edge defined identically for all cutting edges.

Heretofore, such points will be referred to as path points'. One example for path points may be the start/end point of the cutting edge, the middle of the cutting edge, its outermost radial point etc. In particular, with respect to cutting tool adapted to revolve about a central axis, the cutting portion may extend about the central axis, and the path points may be constituted by the set of the outermost radial point of each cutting edge.

According to one aspect of the disclosed subject matter of the present application there is provided a cutting portion of an integral cutting tool or of a cutting insert adapted for mounting onto a cutting tool holder to form a cutting tool, comprising a plurality n of cutting edges, the cutting portion extending along a cutting path about a central axis, the cutting path passing through a point of each of the cutting edges which is at a maximal radial space R from the central axis, such that $$n \geq \frac{3D}{4} \cdot \frac{\theta}{360}$$

where D=2R and θ is the angular extension of the cutting portion about the central axis, and such that at any given point along the cutting portion, $$\frac{3D}{n} \geq L \geq \frac{3D}{2n},$$

where L is the extension of the cutting portion in a direction perpendicular to the cutting path.

Between two neighboring cutting edges of the same cutting portion there may extend a chip evacuation channel adapted for the evacuation of chips removed from the workpiece during a cutting operation. In particular, each cutting edge has at least one chip evacuation channel neighboring therewith. Thus, the term 'extension of the cutting portion' should be understood as the extension of the chip evacuation channel perpendicular to the cutting path.

According to another aspect of the disclosed subject matter of the present application there is provided a cutting portion of an integral cutting tool or of a cutting insert adapted for mounting onto a cutting tool holder to form a cutting tool, comprising a plurality n of cutting edges, the cutting portion extending along a cutting path about a central axis, the cutting path passing through a point of each of the cutting edges which is at a maximal radial space R from the central axis, such that $$n \geq \frac{3D}{4} \cdot \frac{\theta}{360}$$

where D=2R and θ is the angular extension of the cutting portion about the central axis, and such that at any given point along the cutting portion, $$\frac{3D}{n} \geq L \geq \frac{3D}{2n},$$

where L' is the extension of the cutting edges of the cutting portion in a direction perpendicular to the cutting path.

According to a specific example, the number of cutting edges may be equal to the number of millimeters in the diameter of the cutting head.

According to a further specific example, the axial extension L may be in the range of 0.2÷3 mm, more particularly in the range of 0.5÷2.5 mm, and even more particularly in the range of 1÷1.5 mm.

According to a specific example, the cutting edges of the cutting portion may be disposed along a circumference of at least a sector of a circle, defined about a central axis. In particular, the cutting insert may be designed such that when said cutting insert is mounted onto the cutting tool holder, the central axis of the circle coincides with a central axis of the cutting head holder.

According to one example, said cutting insert may be in the form of a circular disc, i.e. having an angular extension θ of 360°, with its cutting edges disposed along the circumference of the circle. According to another example, said cutting insert may be in the form of a sector of a circle, having its cutting edges disposed along the circular portion of the circumference of said sector, such that two adjacent cutting insert may form together a continuous circumferential rim having a greater angular extension than that of each of the cutting inserts alone.

Said cutting insert may comprise a top face and a bottom face and at least one side wall extending therebetween, said cutting portion extending along at least a segment of said at least one side wall.

Said cutting insert may be a reversible cutting insert, wherein said cutting portion is formed with a first set of at least two cutting edges, and a second set of at least two cutting edges, such that in a first position of the cutting insert the first set of cutting edges is adapted for removing a chip from the workpiece during operation of the cutting head, and in a second, reversed position of the cutting insert the second set of cutting edges is adapted for removing a chip from the workpiece during operation of the cutting head.

In particular, said cutting insert may have a central plane extending between said top face and said bottom face and parallel thereto, and comprises a first cutting portion extending along said segment such that the cutting edges thereof extend between the top face and the central plane, and a second cutting portion the cutting edges of which extend between the bottom face and the central plane, the cutting insert being reversible between a first position in which the first cutting portion is adapted for coming in contact with the workpiece and a second, reversed position in which the second cutting portion is adapted for coming in contact with the workpiece.

According to an alternative design, the cutting portion may extend along a helical cutting path, spiraling about the central axis. In particular, for a cutting tool adapted for revolving about the central axis in a first direction during the cutting operation, the helical cutting path may extend in one of the following ways:

in a direction which is the same as the first direction (e.g. both CW or both CCW), in which case the inclination angle of the helical cutting path with respect to the central axis may be an acute angle, in particular, an angle less than 45°, even more particularly, less than 30°, even more particularly, less than 15°, and even more particularly, less than 8°.

In a direction which is opposite the first direction (e.g. the revolution is CW direction and the helix extending in a CCW direction), in which case the inclination angle of the helical cutting path with respect to the central axis may be an obtuse angle, in particular, an angle greater than 135°, even more particularly, greater than 150°, even more particularly, greater than 165°, and even more particularly, greater than 172°.

In addition, the cutting portion may extend several turns (it should be understood that the term 'turn' is herein interchangeable with the term 'twist') about the body of the cutting head, i.e. more than 360°. Furthermore, an integral cutting tool or a cutting tool assembled from the cutting tool holder and corresponding cutting inserts may be formed with a plurality of helical cutting portions, each helically extending about the central axis of the cutting tool. For example, such a cutting tool may be formed with three cutting portions, the start points of which are equally angularly spaced (i.e. 120° apart).

In particular, the design may be such that between each two neighboring turns of the same cutting portion or between two neighboring turns of different cutting portions of the same cutting tool, there may extend a chip evacuation flute adapted for the evacuation of chips removed from the workpiece during a cutting operation.

It should be noted that the terms 'chip evacuation flute' and 'chip evacuation channel' are not interchangeable, as the term 'chip evacuation channel' refers to a channel between two neighboring cutting edges of the same cutting portion, whereas the term 'chip evacuation flute' refers to a flute formed between two neighboring turns of the same cutting portion or between the turns of two different cutting portions of the same cutting tool.

According to a particular example, the cutting insert may being the form of a hollow circular body defined about a central axis and having a central cavity, an inner surface and an outer surface, and being further formed with an attachment face adapted for attachment to a cutting tool holder and a work face, axially remote from the attachment face, on which said cutting portion is formed. As in previously described examples, the cutting portion may be planar-circular or may helically extend about the central axis.

It is one of the advantages of the cutting insert of the above example is that the axial extension thereof is such, that is sufficient for forming on the outer surface of the cutting insert a helically extending cutting portion.

The cutting insert, and particularly the cavity thereof may be of conical shape, and said cutting portion may be formed on the wide end of the cone.

According to a particular design, the attachment face of the cutting insert may be formed with at least one insert attachment element and said cutting tool holder may be formed with at least one holder attachment element, the insert attachment element and the holder attachment element being configured for engaging one another via a male/female connection so as to prevent rotation of the cutting insert about the central axis with respect to the cutting tool holder during a cutting operation.

According to one example, the insert attachment elements may be in the form of securing protrusions, and said holder attachment elements may be in the form of recesses adapted to receive therein the securing protrusions. According to another example, the holder attachment elements may be in the form of securing protrusions and said insert attachment elements may be in the form of recesses adapted receive therein the securing protrusions.

The cutting insert may be adapted for receiving within its cavity a similar additional cutting insert such that the inner surface of the cutting insert faces the outer surface of the additional cutting insert, and such that the cutting portion of the cutting insert and the cutting portion of the additional cutting insert form together a combined cutting portion of greater angular extension.

In particular, in such a case, each cutting insert may be formed, with at least one holder attachment element, similar to the holder attachment element of the cutting tool holder, adapted to engage the insert attachment element of the additional cutting insert.

The cutting insert may be adapted to be mounted onto the cutting tool holder by virtue of a fastening screw adapted for passing through said cavity and engaging the cutting tool holder. The fastening screw may have a shape corresponding to the shape of the inner surface of the cavity of the cutting insert. According to a specific design, said fastening screw has a conical shape, corresponding to the conical shape of the cavity.

According to still another aspect of the disclosed subject matter there is provided a cutting insert adapted for mounting onto a cutting tool holder, said cutting insert having a circular body defined about a central axis having an central cavity and an inner surface and an outer surface, both extending along the axial direction between a work face and an attachment face, said cutting insert being formed with at least one cutting path spirally extending along said outer surface from said work face to said attachment face, said cutting path being formed with a plurality of cutting teeth.

Said cutting insert may be adapted for mounting onto said cutting tool holder such that said attachment face engages the cutting tool and said work face being remote from the cutting tool holder and adapted for coming in contact with a workpiece.

According to a particular design, said cutting insert may be adapted to receive therein an additional cutting insert of similar design, such that in effect, a plurality of cutting inserts, each having a portion of a cutting path may be stacked together to form an axially extended cutting insert formed with an extended cutting path. For this purpose, said fastening screw may be axially longer so as to pass through all cutting inserts and still engage the cutting tool holder.

The cutting path of said cutting insert may be similar in shape to the cutting path previously discussed with respect to the previous aspect of the disclosed subject matter, i.e. it may yield to the same formulas:

$$n \geq \frac{3D}{4} \text{ and } \frac{3D}{n} \geq L \geq \frac{3D}{2n}$$

previously disclosed.

According to yet another aspect of the disclosed subject matter there is provided a cutting head adapted for removal of material from the surface of a workpiece, and having a central axis about which it is adapted to revolve in a predetermined direction for performing said removal, said working head comprising a body extending along said central axis and having a proximal end, and a distal end adapted to come in contact with the workpiece, the body being formed with at least one cutting path spirally extending along the circumference of the body from said distal end towards said proximal end, in said predetermined direction, said cutting path being formed with a plurality n of cutting teeth, each of which has a cutting edge.

The cutting head may have a diameter D and each of the plurality n of cutting edges may each have an axial extension L along said central axis, wherein $$n \geq \frac{3D}{4}, \text{ and } \frac{3D}{n} \geq L \geq \frac{3D}{2n}.$$

According to a still further aspect of the disclosed subject matter there is provided a cutting head comprising a body having said central axis, and adapted for removing material from a workpiece by revolving about said central axis in a first direction, said body being formed with a plurality n of helical cutting paths extending along the envelope thereof, each two adjacent cutting paths being spaced apart therebetween by helical chip evacuation channels extending helically along the envelope in a second direction opposite said first direction, and wherein said body is further formed with a spiral chip evacuation channel extending along the envelope of the body in a second direction opposite said first direction, adapted to divide said helical cutting patch into discrete segments.

The number of helical cutting paths n may be yielded by the following equation:

$$n \geq \frac{3D}{4}.$$

The width of said spiral chip evacuation channel may be designed such that the axial distance of each segment of the helical cutting path has an axial extension L yielded by the following equations:

$$\frac{3D}{n} \geq L \geq \frac{3D}{2n}.$$

According to yet a further aspect of the present invention there is provided a cutting head of an integral cutting tool or of a cutting insert adapted for mounting onto a cutting tool holder to form a cutting tool, said cutting tool being adapted for removing material from a workpiece by revolving about a central axis thereof, said cutting head having a body extending along said central axis between a front end and a rear end thereof, said body being formed with:

- a plurality of cutting portions helically extending about the central axis between the front end and the rear end of the cutting head in a first direction;
- a plurality of chip evacuation flutes, helically extending about the central axis between the front end and the rear end of the cutting head in a first direction such that each two neighboring cutting portions are spaced apart therebetween by a chip evacuation flute; and
- a plurality of chip evacuation channels helically extending about the central axis between said front end and said rear end in a second direction, opposite said first direction;
- wherein said chip evacuation channels divide each of said cutting portions into discrete segments, each such segment having a cutting edge defined at the intersection between said chip evacuation channel and said cutting portion.

According to another aspect of the disclosed subject matter there is provided a cutting head adapted for the removal of material from the surface of a workpiece, said cutting head extending along a central axis about which it is designed to revolve, and having a proximal end, and a distal end formed with a cutting portion adapted for removal of material from said workpiece, said distal end having a diameter D and comprising a plurality of cutting edges n, each having an axial extension L along said central axis, wherein $$n \geq \frac{3D}{4}, \text{ and } \frac{3D}{n} \geq L \geq \frac{3D}{2n}.$$

According to another aspect of the disclosed subject matter there is provided a cutting insert adapted for mounting onto a cutting head holder to form a cutting head, said cutting insert comprising a mounting portion for engaging said cutting head holder and a cutting portion adapted for removing material from a workpiece during a cutting operation, said cutting portion having at least two cutting edges, wherein, when the cutting insert is mounted onto said cutting head holder, said at least two cutting edges are adapted to work simultaneously during said cutting operation.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 4E is a schematic front view of the cutting tool shown in FIG. 4A

FIG. 5C is a schematic enlarged view of detail F shown in FIG. 5B;

FIG. 5D is a schematic isometric cross-section view of the cutting tool holder shown in FIG. 5A;

FIG. 5F is a schematic front view of a portion of the cutting tool shown in FIG. 5A;

FIGS. 7A and 7B are schematic side views of cutting inserts having different cutting angles according to the disclosed subject matter;

FIGS. 8A and 8B are schematic cross-section representations of cutting inserts having differently shaped cutting edges according to the disclosed subject matter;

DETAILED DESCRIPTION OF EMBODIMENTS

Figure 1B:
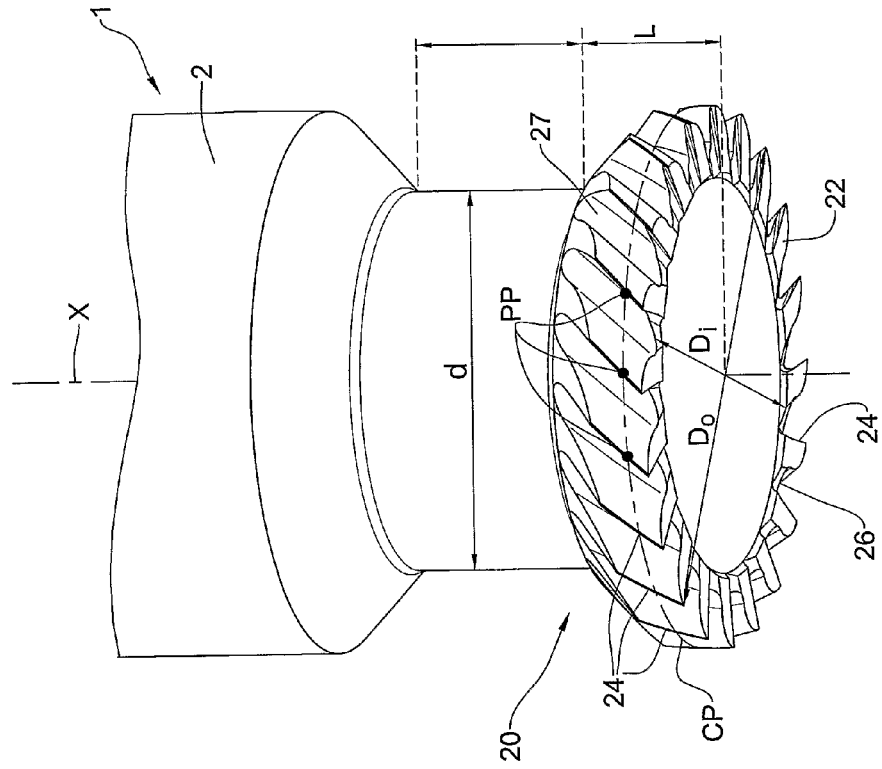
FIG. 1B is a schematic enlarged view of detail A shown in FIG. 1A.
Figure 1A:
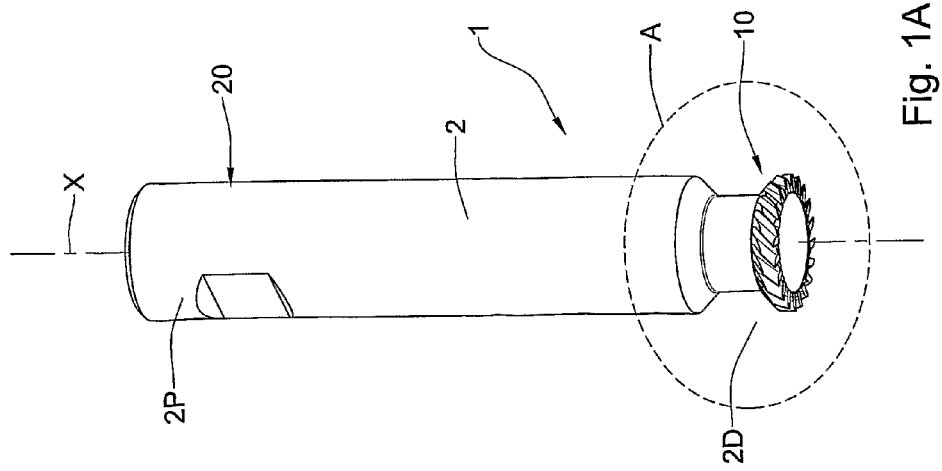
FIG. 1A is a schematic isometric view of a cutting tool according to the disclosed subject matter.

With reference to FIG. 1A, a cutting tool generally designated as 1 is shown comprising a body 2 extending along a central axis X, and having a proximal end 2P and a distal end 2D, formed with a mounting portion 10 and a cutting head 20 respectively.

The cutting head 20 of the cutting tool 1 is adapted for removing a thin layer of material from a workpiece (not shown) when coming in contact therewith during rotation of the cutting tool 1. The removal of the layer is achieved by the removal of chips from the surface of a workpiece, with the cutting tool 1 progressing laterally to the central axis X while revolving thereabout, and while in contact with said workpiece.

Figure 1D:
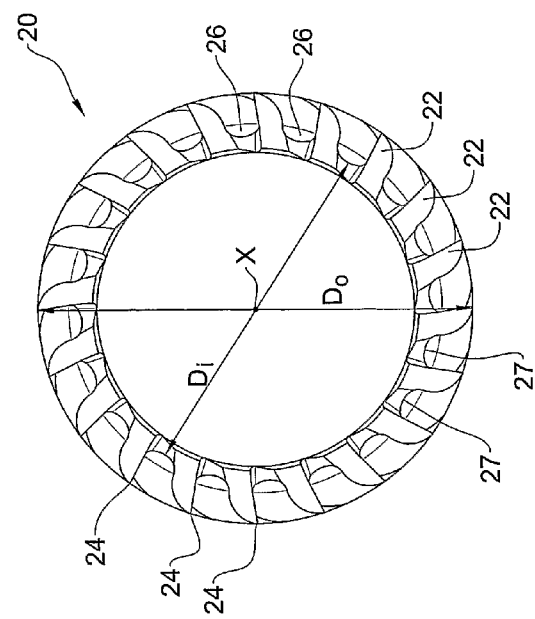
FIG. 1D is a schematic bottom view of the cutting tool shown in FIG. 1A.
Figure 1C:
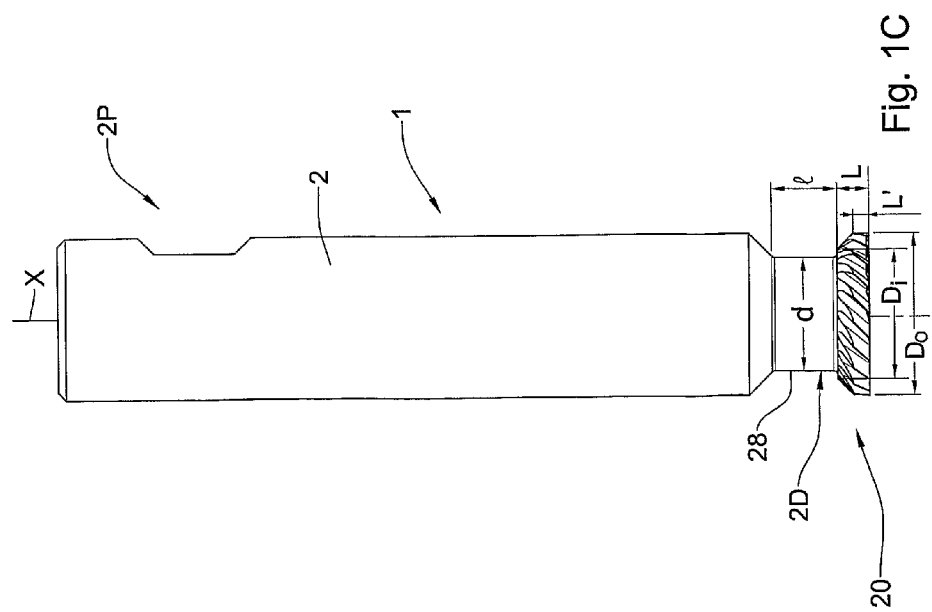
FIG. 1C is a schematic side view of the cutting tool shown in FIG. 1A.

With particular reference to FIGS. 1B to 1D, the cutting head 20 is formed with a cutting portion having a plurality n of cutting teeth 22, each having a cutting edge 24. The cutting teeth 22 are equally spaced about the central axis X. Between each two adjacent cutting teeth 22, there is formed a chip evacuation channel 26, adapted for the evacuation of chips removed from the workpiece (not shown).

The cutting portion of the cutting head 20 extends about the central axis X along a cutting path CP, which is a curve passing through path point, each located on a different cutting edge 24, the points having the maximal radial extension with respect to the X axis (however, is should be understood that any set of points on the cutting edges may constitute the path points, so long as the path point is chosen in the same manner for each of the cutting edges, e.g. the middle of the cutting edge, start point of the cutting edge etc.). In this particular example, the cutting path CP defines a planar circle.

The cutting edges 24 of the cutting teeth 22 define an outer envelope of diameter $D_o$, while inner surfaces 27 of the chip evacuation channels 26 define an inner envelope of diameter $D_i < D_o$. The number of the cutting teeth depends on the outer diameter $D_o$ and is given by the formula:

$$n \geq \frac{3D}{4}.$$

The cutting portion of the cutting head 20 further has an axial extension L which also depends on the outer diameter $D_o$ and on the number of cutting teeth 22, given by the formula:

$$\frac{3D_o}{n} \geq L \geq \frac{3D_o}{2n}.$$

The axial length L is thus generally much shorter than known cutting tools.

It should be noted that in this particular example, the dimension L is the axial dimension of the cutting portion of the cutting head 20, this is because the cutting path CP defines a planar circle, perpendicular to the central axis X of the cutting tool 1. However, it should be understood that since the dimension L is taken perpendicular to the cutting portion of the cutting head 20, it does not necessarily have to be an axial dimension, and depends on the orientation of the cutting portion with respect to the central axis X.

The specific axial length L is chosen, on one hand, to be short enough so as to considerably reduce the resistance of the chip evacuation channels 26 to chips proceeding therealong during a cutting operation of the cutting tool 1 with respect to known tools, and on the other hand, to be long enough so as to provide proper support for the cutting edges 22 during the same cutting operation. It is noted, in this respect, that the axial extension of the cutting edges L' is not as long as the axial extension L of the entire cutting head 20, i.e. L'<L.

The cutting head 20 is spaced from the body 2 of the cutting tool 1 by an extension portion 28 having an axial extension l at least equal to L, and a diameter $d \leq D_i$, so as not to obstruct chips exiting the chip evacuation channels 26. In this particular example, the cutting head 20 has the following characteristics: n=20, $D_o$=20 mm, $D_i \cong$16.2 mm, L$\cong$4 mm, d$\cong$16 mm, and l$\cong$8 mm.

In operation, the cutting tool 1 revolves about the central axis X thereof, and is brought in contact with the surface of the workpiece (not shown). When the cutting edge 24 of a cutting tooth 22 comes in contact with the material of the workpiece, it 'peels off' a chip. Since the cutting head 20 has an increased number of teeth (n=20) with respect to known cutting tools, each chip is generally shorter than a chip formed by a cutting head having a lesser number of cutting teeth for the same diameter. The removed chip is then urged up the chip evacuation channels 26, and once it passes an axial distance L it exits the chip evacuation channel 26 and is simply discarded from the cutting tool 1. It is important to note that once the chip has passed the chip evacuation channel 26, it disengages from the cutting tool 1.

The design of the cutting tool disclosed above, provides, among other things, reducing the resistance of the workpiece to chipping, due to the shortened axial extension L of the cutting head 20, and consequently the reduced resistance of its chip evacuation channels 26 to chips passing therethrough. This, in turn, allows implementing the cutting tool 1 in at least any one of the following ways:

under a same feed F and revolution speed $V_R$, the cutting tool 1 with the above parameters may be subjected to considerably lower loads than an equivalent cutting tool with a longer extension L and a smaller number of teeth n, and, as such, be used for a longer overall period of time T;

under the same loads, the cutting tool 1 may operate at a feed F and revolution speed $V_R$ which are greater than those of an equivalent cutting tool 1 with a longer extension L and a smaller number of teeth n, and, as such, remove a greater amount of material from the workpiece per time unit t;

under the same revolution speed $V_R$, the cutting tool 1 may be allowed a greater feed F than an equivalent cutting tool with a longer extension L and a smaller number of teeth n, thus removing a greater amount of material from the workpiece per time unit t; and under the same feed F, the cutting tool 1 or the workpiece may be allowed a greater revolution speed $V_R$ than an equivalent cutting tool with a longer extension L and a smaller number of teeth n, removing a greater amount of chips per time unit t.

With respect to the above, it should be understood that the term 'longer' refers to an axial length which does not yield to axial extension L of the cutting tool 1 described above yielding to the previously noted formula:

$$\frac{3D_o}{n} \geq L \geq \frac{3D_o}{2n}.$$

Another advantage of the above design, and specifically of the axial length L is the fact that the chip evacuation channels 26 may be formed as straight slots, rather than spiral or helical channels as known in the art. This allows simplifying the manufacturing process of the cutting head 20, and allows direct control over the resistance of the channels 26 to chip evacuation, as will be discussed in detail with respect to FIGS. 7A to 7C.

Figure 2B:
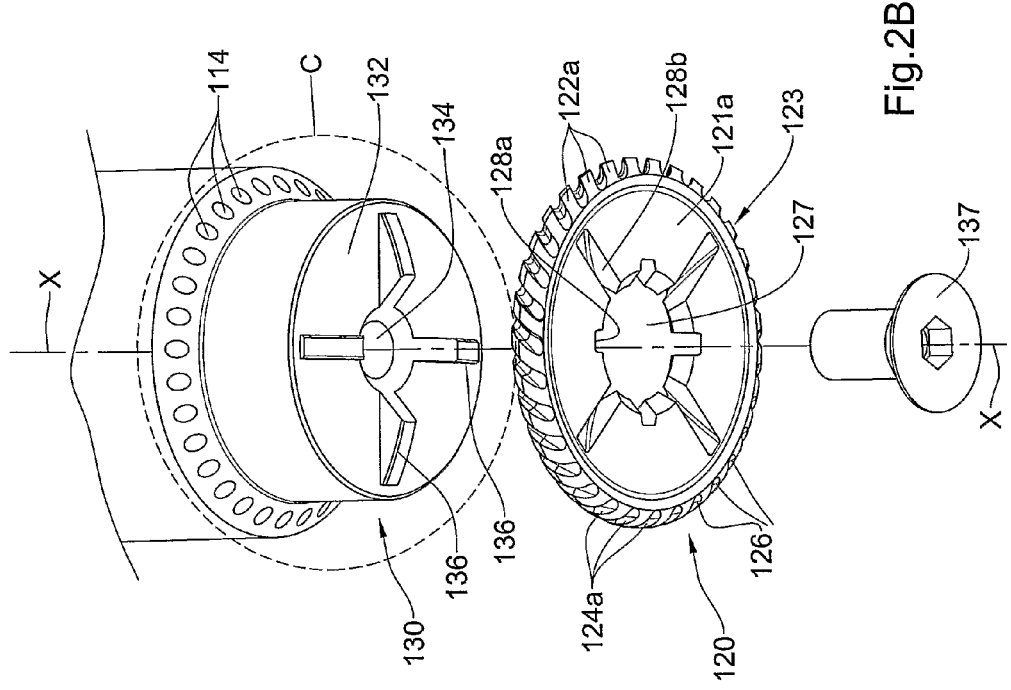
FIG. 2B is a schematic exploded view of the cutting tool shown in FIG. 2A.
Figure 2A:
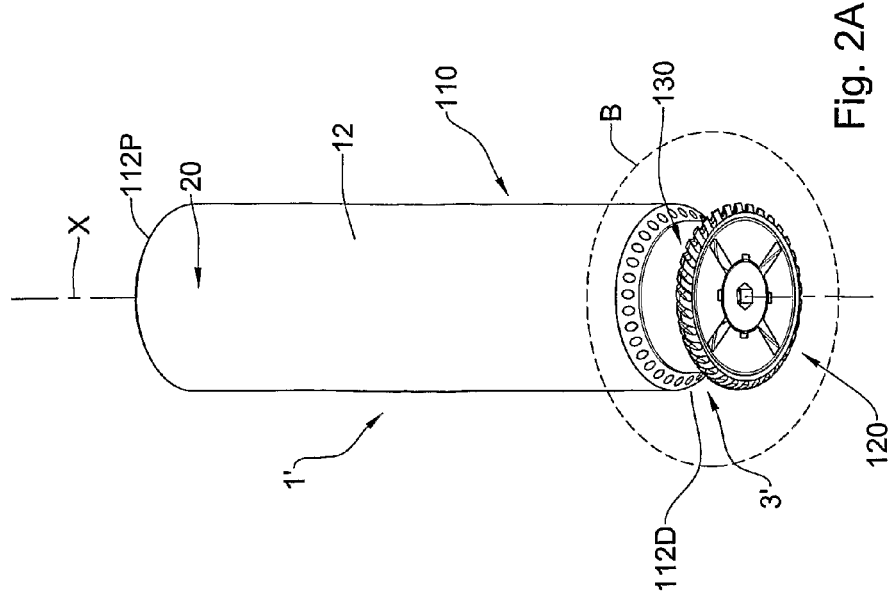
FIG. 2A is a schematic isometric view of a cutting tool according to another embodiment of the disclosed subject matter, comprising a cutting tool holder and a cutting insert.

Turning now to FIGS. 2A and 2B, another embodiment of a cutting tool generally designated as 1' is shown comprising a cutting tool holder 110 and a reversible cutting insert 120. The cutting tool holder 110 has a body 112 extending along a central axis X, and having a proximal end 112P' and a distal end 112D' to which the cutting insert 120 is attached to form a cutting tool head 3'.

The cutting tool holder 110 is formed at a distal end 112D thereof with a mounting portion 130 adapted for mounting thereon of the cutting insert 120. The mounting portion 130 is formed with a front face 132 and has a centrally disposed threaded hole 134 coinciding with the central axis X and adapted for receiving therethrough a fastening screw 137. The cutting tool holder 130 further comprises four aligning ridges 136 formed on the front face 132 thereof, and adapted to be received within corresponding grooves 128a, 128b of the cutting insert 120. The cutting tool holder 110 is further formed with channels 144 adapted for the provision of cooling fluid during operation of the cutting tool 1'.

The cutting insert 120 comprises a body 121 of a circular shape having a central axis X and a circumferential rim, and formed with a first side surface 121a and a second side surface 121b. The body 121 is formed with a plurality of chip evacuation channels 126 cut into the body 121 along the circumference thereof so as to define between each two adjacent channels 126 a corresponding body element 122. Each such body element 122 has a right and a left full-edge 124 extending along the respective evacuation channels 126 located on the right and left side of the body element 122.

It is further observed that the chip evacuation channels 126 are straight (i.e. not helical or spiral) and are slanted with respect to the central axis X of the cutting insert 120, in this particular case, by about 40°.

With particular reference to FIGS. 3A to 3D, the cutting insert 120 is divided by a central plane (not shown) extending perpendicular to the central axis X and located between the first side surface 121a and the second side surface 121b, and oriented parallel thereto. The central plane divides the cutting insert into a first side portion 120a and a second side portion 120b. Thus, each of the body elements 122 may be divided into respective first and second body cutting tooth 122a, 122b, the former being associated with the first side portion 120a and the latter being associated with the second side surface 120b. Each of the cutting teeth 122a, 122b is thus formed with two half-edges, each constituting half of the edges 124 of the body element 122.

The two half-edges of each cutting tooth 122a, 122b are arranged such that one half-edge thereof serves as a cutting edge 124a, 124b, associated with the respective first and second side portions 120a, 120b, and the other half-edge 124' is idle. The half-edges are also arranged such with respect to one another that each full edge 124 is constituted by a cutting half-edge of one cutting tooth and an idle-half edge of the other cutting tooth. In other words, each body element 122 has two full edges 124, the first being constituted by the cutting edge 124a and an idle half-edge 124', and the other being constituted by the cutting edge 124b and an idle half-edge 124'.

The cutting insert 120 is further formed with a central hole 127 coinciding with the central axis X, and adapted for receiving therethrough the fastening screw 137. Each of the portions 120a, 120b is also formed with four grooves 128a, 128b respectively grooved in the respective first and second side surface 121a, 121b, and adapted for receiving therein the alignment ridges 136 of the cutting tool holder 110.

Figure 3A:
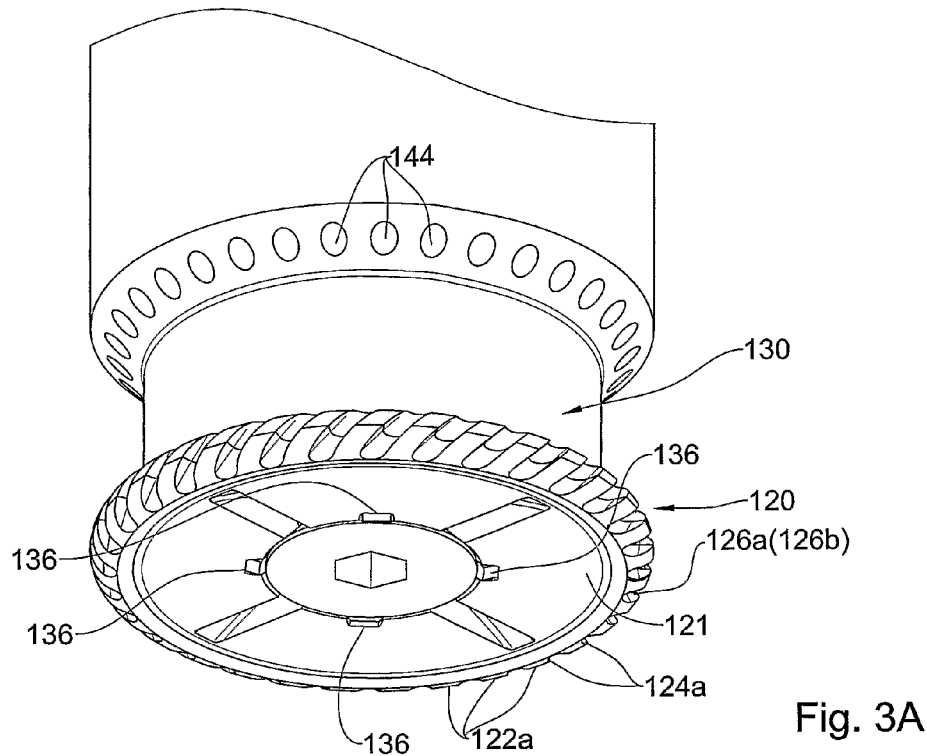
FIG. 3A is a schematic enlarged view of the detail B shown in FIG. 2A.
Figure 3B:
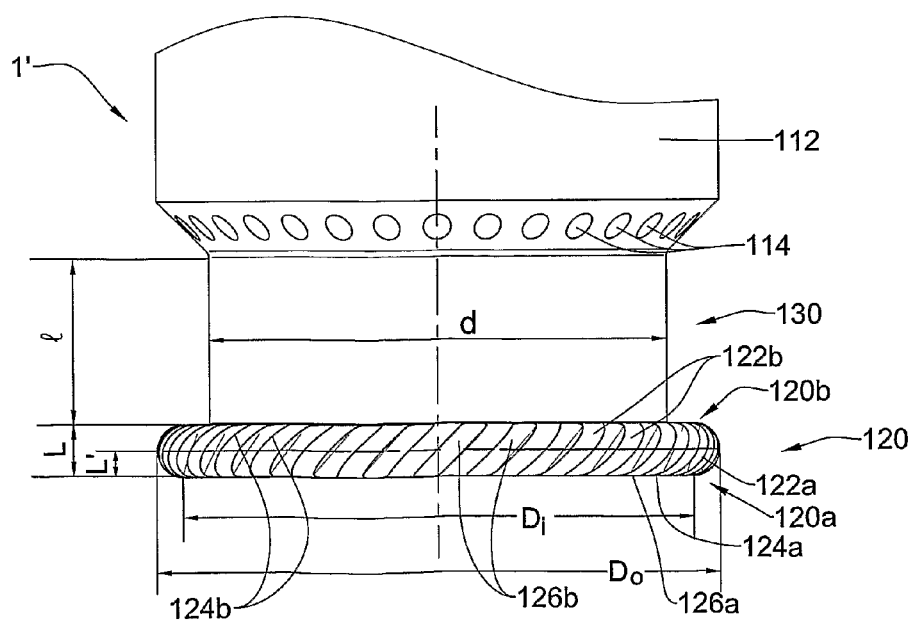
FIG. 3B is a schematic front view of detail B shown in FIG. 3A.
Figure 3D:
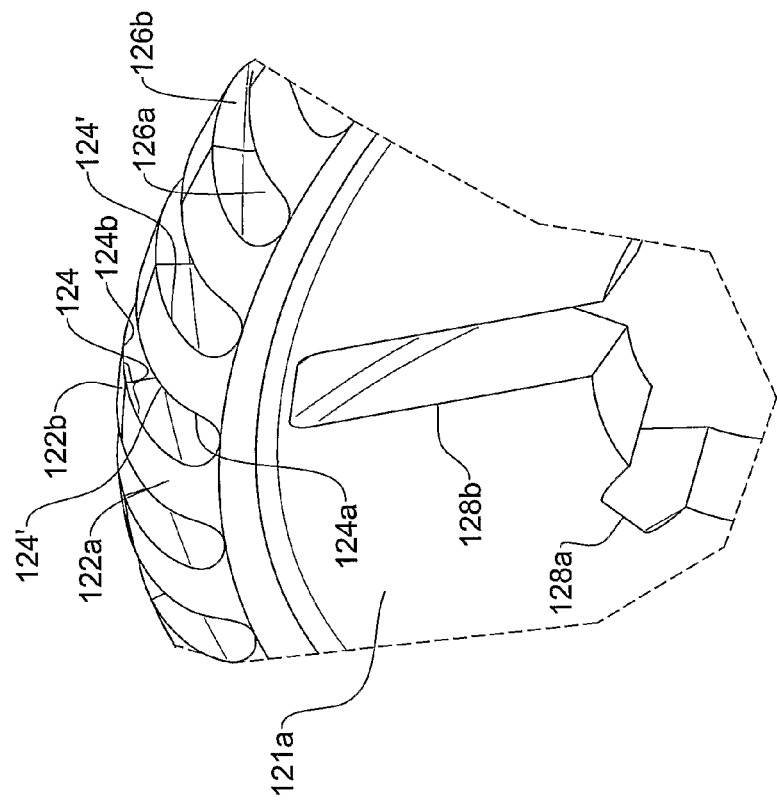
FIG. 3D is a schematic enlarged view of detail D shown in FIG. 3C.
Figure 3C:
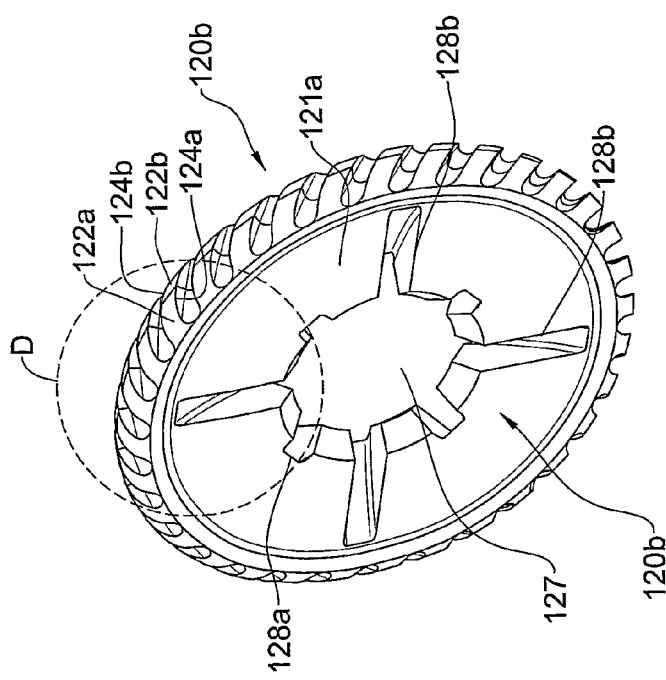
FIG. 3C is a schematic isometric view of the cutting insert shown in FIG. 2A.
Figure 3E:
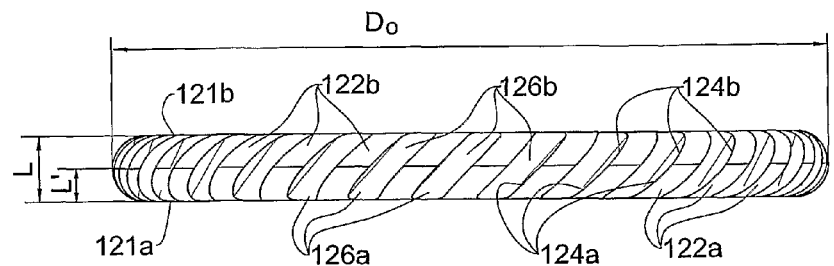
FIG. 3E is a schematic front view of the cutting insert shown in FIG. 2B.
Figure 3F:
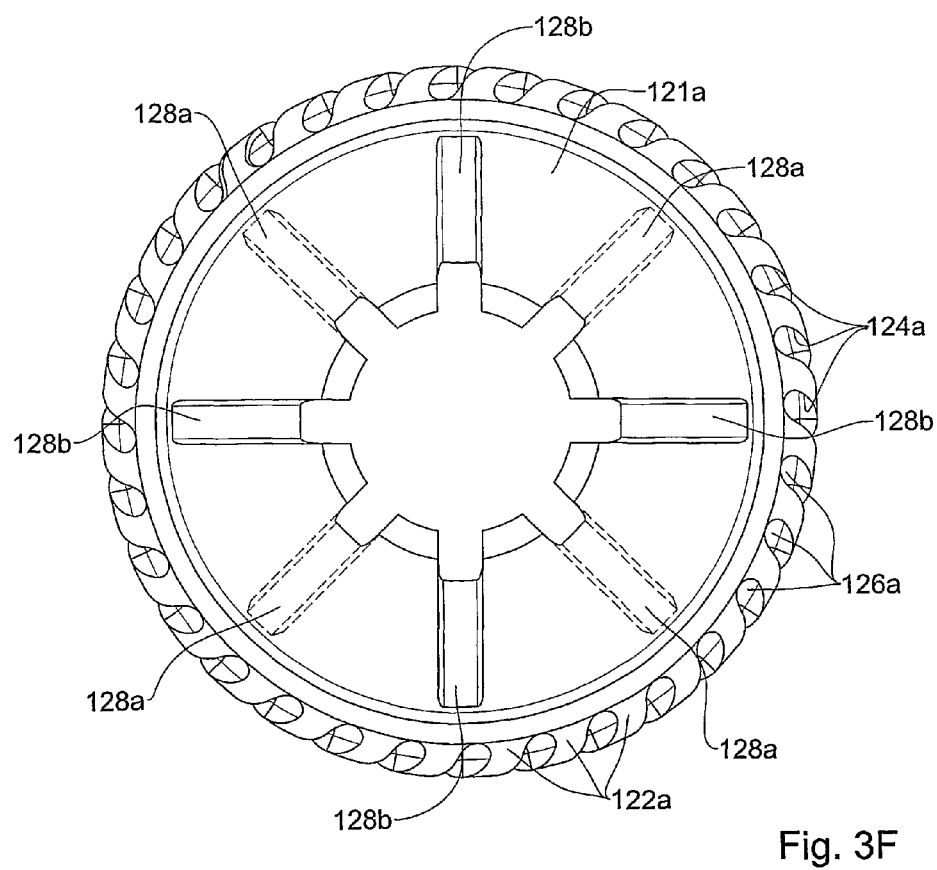
FIG. 3F is a bottom view of the cutting insert shown in FIG. 3E.
Figure 4B:
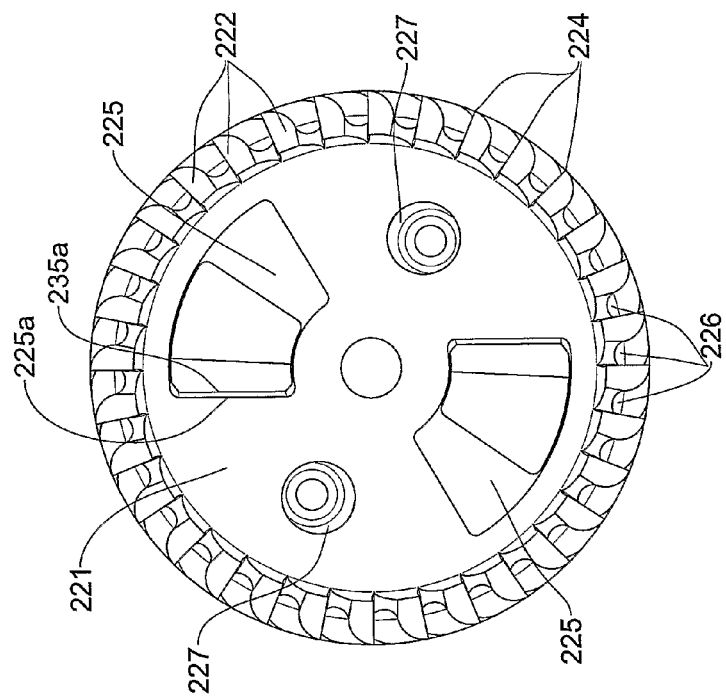
FIG. 4B is a schematic bottom view of the cutting tool shown in FIG. 4A.
Figure 4A:
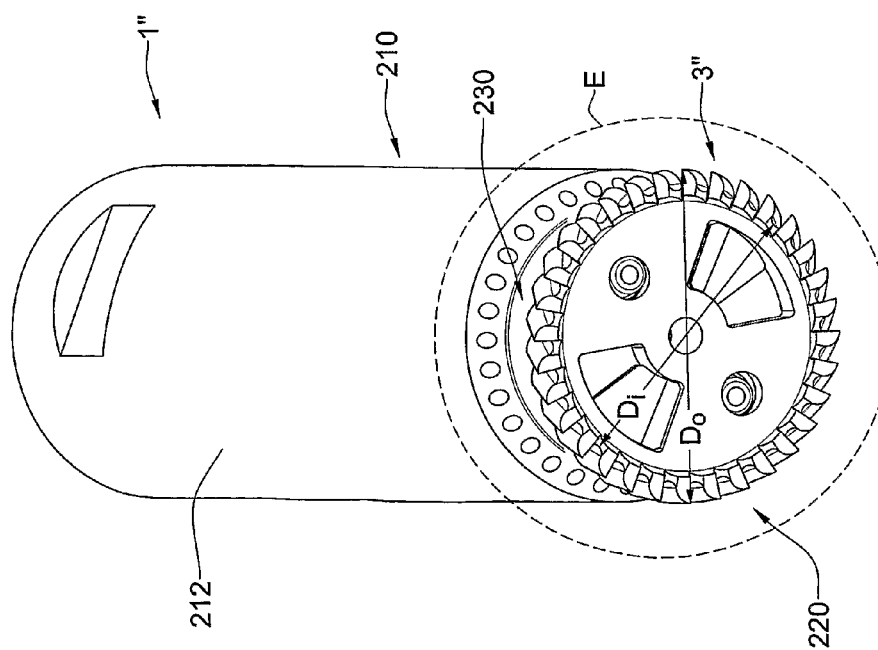
FIG. 4A is a schematic isometric view of a cutting tool according to a further embodiment of the disclosed subject matter, also comprising a cutting tool holder and a cutting insert.
Figure 4D:
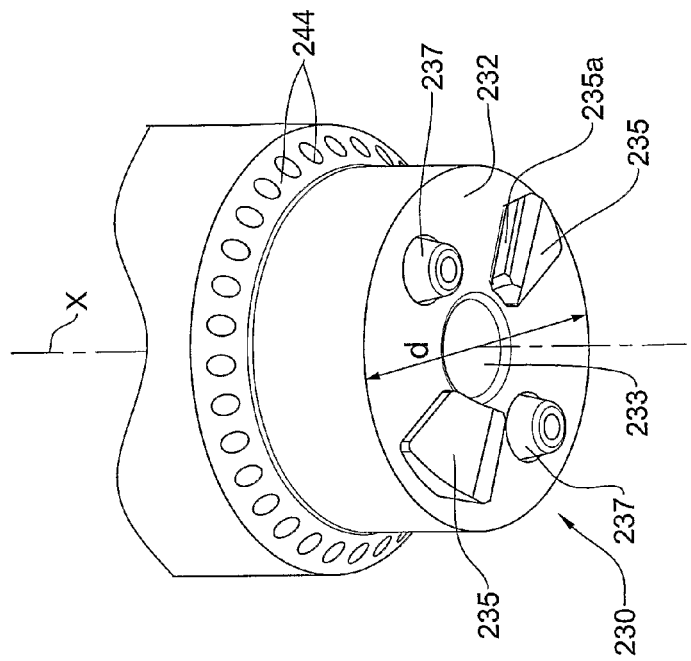
FIG. 4D is a schematic isometric view of the cutting tool holder shown in FIG. 4C with the cutting insert removed therefrom.
Figure 4C:
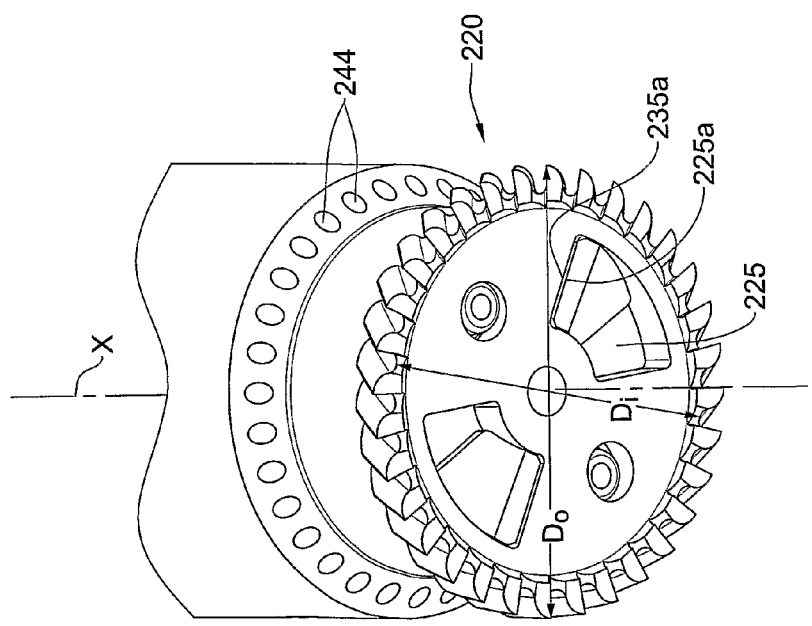
FIG. 4C is a schematic enlarged view of detail E shown in FIG. 4A.

With particular reference to FIG. 3F, it is observed that the grooves 128a, 128b on each side extend from the central hole 127 and are angularly spaced by 90° from one another. It is also observed that the grooves 128b are angularly shifted about the central axis X with respect to the four grooves 128a by 45°. Since the grooves 128a, 128b should have a certain depth in order to receive therein the alignment ridges 136, such a design allows using deeper grooves, having a depth extending almost the entire width L of the cutting insert 120, and correspondingly using alignment ridges 136 having a greater extension from the front surface 132, thus improving alignment and securing of the cutting insert 120 to the cutting tool holder 110.

Turning now to FIG. 3B, the cutting insert 120 has an outer diameter $D_o$ corresponding to the envelope defined by the cutting edges 124a, 124b, and an inner diameter $D_i$ corresponding to the envelope defined by the inner-most points of the chip evacuation channels 126. The cutting insert 120 has an axial width L such that each portion 120a, 120b has an axial width L'=L/2. It is further observed that the mounting arrangement 130 of the cutting tool holder 110 has a diameter d about the central axis which is smaller than the diameter $D_i$ of the cutting insert 120 ($d<D_i$) and an axial extension l which is greater than L (l>L). This serves a purpose similar to the purpose disclosed with respect to the previous embodiment of the invention. In this particular example, $D_o$=20 mm, n=20, d≅18 mm, and L=3 mm.

In the position shown in FIG. 3B, the cutting insert 120 is mounted onto the mounting portion 130 such that the second portion 120b is facing the mounting portion 130, i.e. the second side face 121b is flush against the front face 132 of the mounting portion 130, and the first portion 120a is facing away from the mounting portion 130, and towards a workpiece (not shown). In this position, the cutting tool 1' is adapted for rotating CCW about the central axis X and the cutting edges 124a are facing in the CCW direction (i.e. on the left side of the cutting teeth 122a).

In operation, the cutting edges 124a come in contact with the workpiece (not shown), and remove chips therefrom. The chips are then urged up the chip evacuation channels 126 and are discarded therefrom when reaching the second side surface 121b. It should be noted that although, in operation, the effective cutting depth is L' and not the entire axial width L of the cutting insert 120, the second cutting tooth 122b provides firm support to the cutting edges 124a of the first cutting tooth 122a of the cutting insert 120.

Turning now to FIGS. 4A to 4E, a cutting tool generally designated as 1" is shown comprising a cutting tool holder 210 and a cutting insert 220. The cutting tool holder 210 has a body 212 extending along a central axis X, and having a proximal end 212P' and a distal end 212D' to which the cutting insert 120 is attached to form a cutting tool head 3".

The cutting tool holder 210 is formed at a distal end 212D thereof with a mounting portion 230 adapted for mounting thereon of the cutting insert 220. The mounting portion 230 is formed with a front face 232 and has a centrally disposed threaded hole 233 coinciding with the central axis X and adapted to receive therethrough a corresponding alignment shaft 223. The cutting tool holder 230 further comprises two aligning protrusions 235 formed on the front face 232 thereof, and adapted to be received within corresponding cut-outs 225 of the cutting insert 220. In addition, the mounting portion 230 of the cutting tool holder is formed with a securing mechanism 236 comprising two securing pins 237 received within corresponding holes 238, and biased by biasing springs 239 (not shown).

It should be appreciated that the securing mechanism disclosed above is generally similar to the securing mechanism disclosed in Patent Application WO/08149371A1 to the applicant, which is incorporated herein by reference. Therefore, the securing mechanism 236 will not be discussed in detail herein, and the manner of operation thereof should be apparent to any person skilled in the art familiar with the above incorporated Patent Application.

The cutting tool holder 210 is further formed with channels 244 adapted for the provision of cooling fluid during operation of the cutting tool 1".

The cutting insert 220 is formed of a circular body 221 having a central axis X and a circumferential rim. The body 221 is formed with a plurality of chip evacuation channels 226 cut into the body 221 along the circumference thereof so as to define between each two adjacent channels 226 a corresponding cutting tooth 222. Each such cutting tooth 222 has a cutting edge 224 extending along the chip evacuation channel 226.

It is further observed that the chip evacuation channels 226 are straight (i.e. not helical or spiral) and are slanted with respect to the central axis X of the cutting insert 120, in this particular case, by about 45°.

The cutting insert 220 is further formed with a central alignment shaft 223 extending along the central axis X and adapted to be received within a corresponding hole 233 of the cutting tool holder 210, and two cut-outs 225 adapted to receive therethrough corresponding aligning protrusions 235 of the mounting portion 230 of the cutting tool holder 210.

The cutting insert 220 has an outer diameter $D_o$ corresponding to the envelope defined by the cutting edges 224a, 224b, an inner diameter $D_i$ corresponding to the envelope defined by the inner most points of the chip evacuation channels 226, and an axial width L. It is further observed that the mounting arrangement 230 of the cutting tool holder 210 has a diameter d about the central axis which is smaller than the diameter $D_i$ of the cutting insert 220 ($d<D_i$) and an axial extension l which is greater than L (l>L). This serves a purpose similar to the purpose disclosed with respect to the previous embodiment of the invention. In this particular example, $D_o$=32 mm, n=32, d≅26 mm, and L≅4 mm.

It should also be appreciated that although the cutting insert 220 is shown here to be a non-reversible cutting insert, it is clear that a reversible cutting insert of similar design may be constructed which will have a first portion and a second portion similar to the cutting insert 120 previously described, and being adapted to be mounted on a cutting tool holder similar to the cutting tool holder 230.

Turning now to FIGS. 5A to 5E, a cutting tool generally designated as 1''' is shown comprising a cutting tool holder 310 and eight reversible cutting inserts 320 mounted thereon. The cutting tool holder 310 has a body 312 extending along a central axis X, and having a proximal end 312P and a distal end 312D to which the cutting insert 320 is attached to form a cutting tool head 3''.

The cutting tool holder 310 is formed at a distal end 312D thereof with a mounting portion 330 adapted for mounting thereon of the cutting inserts 320. The mounting portion 330 is formed with a front face 332 and has formed thereon a centrally disposed support structure 333. The support structure 333 is formed with eight branches 334 which are equally spaced therebetween to form eight mounting seats 340, each being defined between to corresponding adjacent branches 334, and adapted to receive therein the eight cutting inserts 320. Each branch 334 is further formed with grooves 335 at the inner sides of the seat 340 adapted for firm retention of the cutting inserts 320 in place. In addition, each mounting seat 340 of the cutting tool holder 310 is formed with a securing mechanism 336 comprising a securing pin 337 received within corresponding hole 338, and biased by a biasing spring 339 (shown FIG. 5E). This securing mechanism 336 is generally similar to the securing mechanism disclosed in the above incorporated Patent Application WO/08149371A1 to the applicant. However, it should be understood than the cutting inserts 320 may be secured to the cutting tool holder 310 by fastening bolts or any other known securing arrangement.

The cutting tool holder 310 is also formed with a central bore 342 adapted to receive therethrough a clamping bolt 350 for attaching the cutting tool holder 310 to an external apparatus (not shown).

With particular reference being drawn to FIGS. 6A to 6F, the cutting insert 320 has a body 321 having the shape of a sector of a circle and having a central axis X and a circumferential rim with an angular extension θ about the central axis X of about 45°. The body 321 is also formed with a plurality of chip evacuation channels 326 cut into the body 321 along the circumference thereof so as to define between each two adjacent channels 326 a corresponding body element 322.

The cutting insert 320 is divided by a central plane (not shown) extending perpendicular to the central axis X and located between the first side surface 321a and the second side surface 321b (and also being parallel thereto). The central plane divides the cutting insert 320 into a first side portion 320a and a second side portion 320b. Thus, each of the body elements 322 is divided into a respective first and a respective second cutting tooth 322a, 322b, the former being associated with the first side portion 320a and the latter being associated with the second side surface 320*b*. Each of the cutting teeth 322*a*, 322*b* is formed with two half-edges, one on each side thereof defined by the intersection with the respective left and right chip evacuation channels 326.

The two half-edges of each cutting tooth 322*a*, 322*b* are arranged such that one half-edge thereof serves as a cutting edge 324*a*, 324*b*, associated with the respective first and second side portions 320*a*, 320*b*, and the other half-edge 324' is idle. The half-edges are arranged such with respect to one another that each body element 322 has two full edges 324, the first being constituted by the cutting edge 324*a* and an idle half-edge 324', and the other being constituted by the cutting edge 324*b* and an idle half-edge 324'.

The cutting insert 320 is further formed with a central hole 327 adapted for receiving therethrough a securing pin 337 of the securing mechanism 336, and two ridges 325 on the sides thereof adapted to fit into the grooves 335 of the seat 334 of the cutting tool holder 310.

Figure 5B:
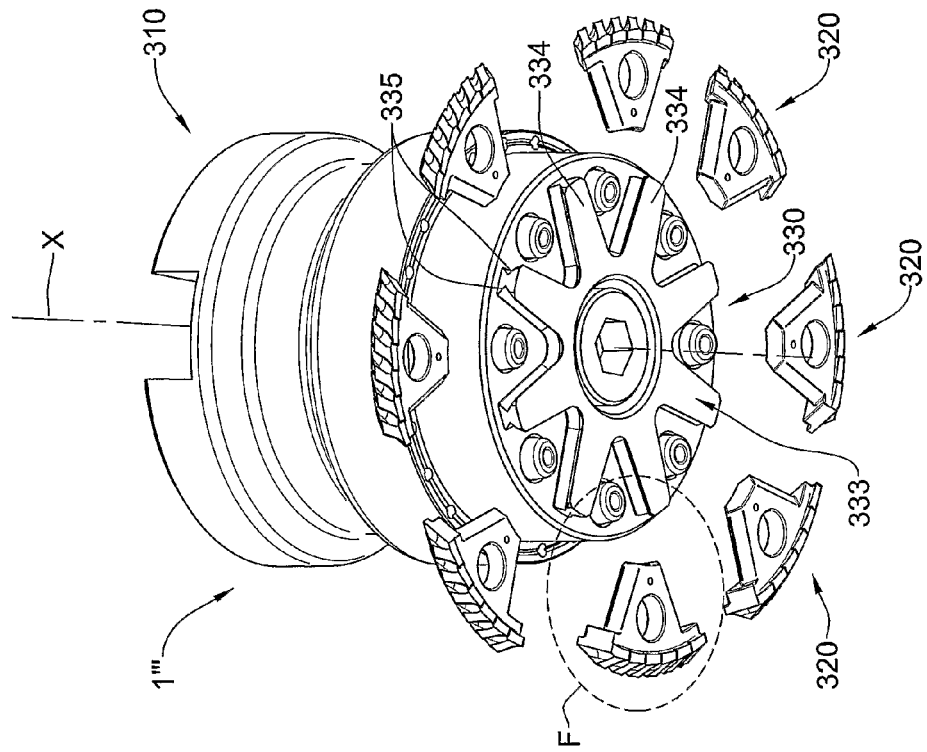
FIG. 5B is a schematic exploded view of the cutting tool shown in FIG. 5A.
Figure 5A:
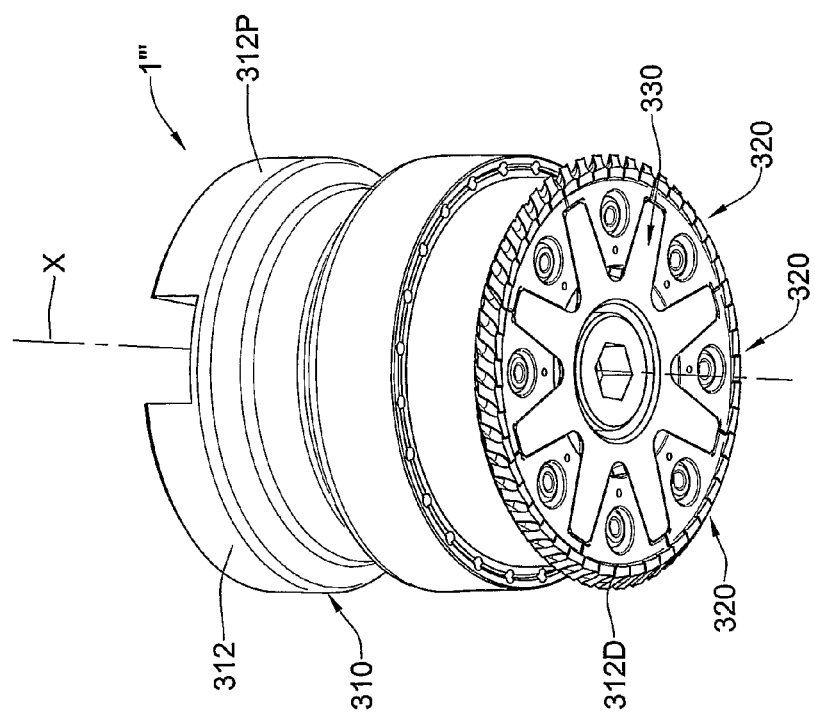
FIG. 5A is a schematic isometric view of a cutting tool according to still another embodiment of the disclosed subject matter, comprising a cutting tool holder and a plurality of cutting inserts.
Figure 5E:
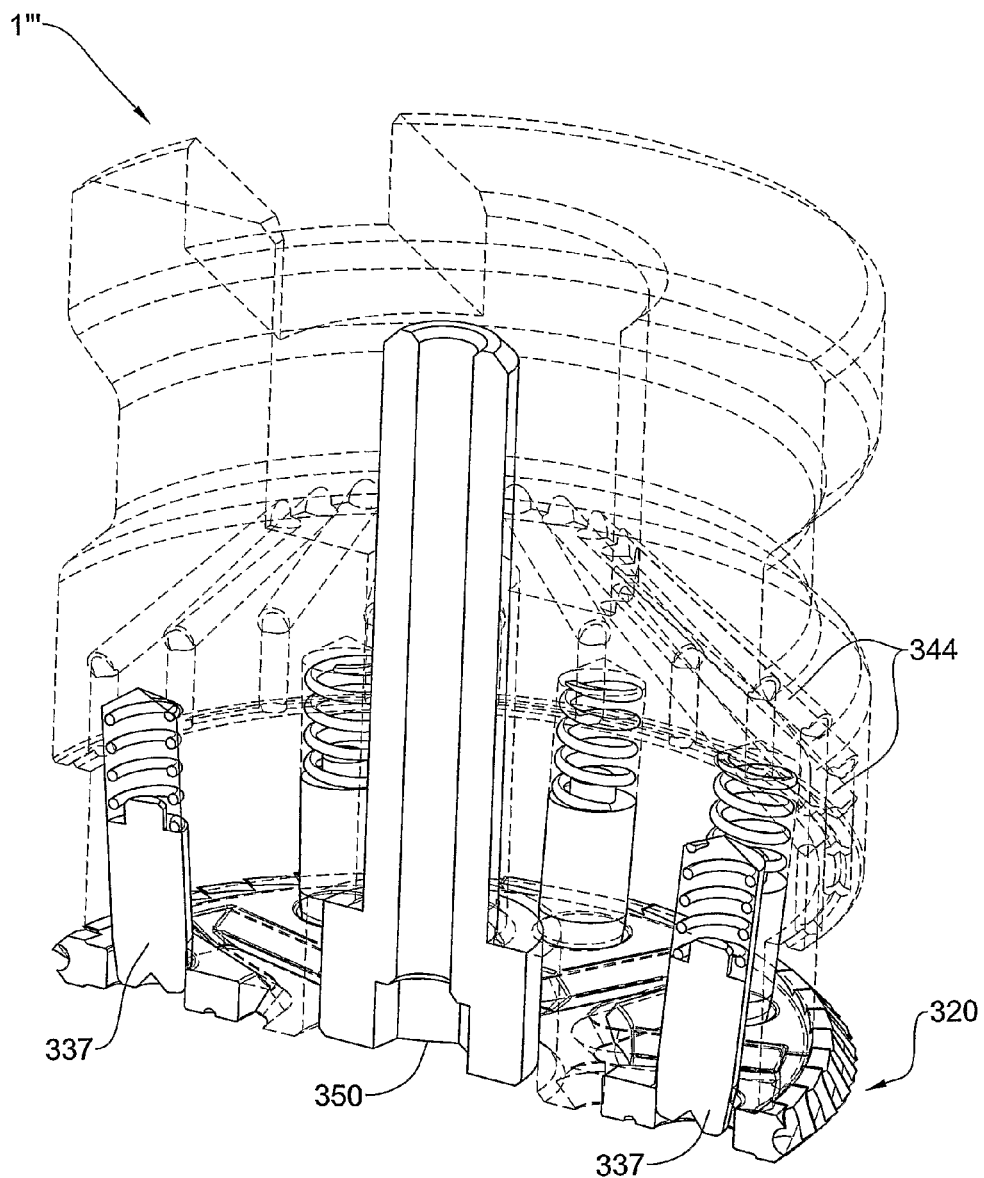
FIG. 5E is a schematic front view of the cutting insert shown in FIG. 5A.

Reverting back to FIG. 5A, the cutting inserts 320 and cutting tool holder 310 are formed such that when the cutting inserts 320 are mounted onto the cutting tool holder 310, the circumferential rim of the cutting inserts 320 forms together a continuous circumferential rim of 360°. With additional reference to FIGS. 6A to 6F, each cutting insert 320 is formed with a left and a right contact surface 328L and 328R respectively. When two cutting inserts 320 are mounted onto the cutting tool holder 310 adjacent one another, the left surface 328L of the right cutting insert 320 becomes flush against the right contact surface 328R of the left cutting insert 320 so as to for a continuous circumferential rim.

Attention is now drawn to FIG. 5F, where it is observed that when all eight cutting insert 320 are mounted onto the cutting tool holder 310, they form a cutting disc having a an outer diameter $D_o$ corresponding to the envelope defined by the cutting edges 324*a*, 324*b*, an inner diameter $D_i$ corresponding to the envelope defined by the inner most points of the chip evacuation channels 326, and an axial width L. The cutting insert 120 has an axial width L such that each portion 320*a*, 320*b* has an axial width L'=L/2. It is further observed that the mounting arrangement 330 of the cutting tool holder 310 has a diameter d about the central axis which is smaller than the diameter $D_i$ of the cutting insert 320 ($d<D_i$) and an axial extension l which is greater than L (l>L). This serves a purpose similar to the purpose disclosed with respect to the previous embodiment of the invention. In this particular example, $D_o$=48 mm, n=48, d≅43 mm, L≅3 mm.

From the above, it yields that each cutting insert 320 is formed with a total of six body elements 322, and twelve cutting teeth—six cutting teeth 322*a* associated with the first side portion 320*a* and six cutting teeth 322*b* associated with the second side portion 320*b*. It should be noted that in any of the two positions of the cutting insert 320 (i.e. such that the first portion 320*a* thereof operates on the workpiece or the second portion 320*b* thereof operates on the workpiece) all six cutting edges 324*a* or 324*b* operate at the same time during the same cutting operation. In other words, this provides a cutting insert having a plurality of cutting edges wherein at least in one of its positions, two or more cutting edges are adapted to perform an operation on the workpiece simultaneously.

Figure 6A:
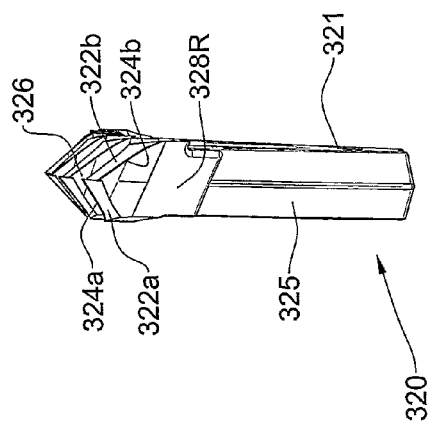
FIG. 6A is a schematic front view of one of the cutting inserts shown in FIG. 5A.
Figure 6B:
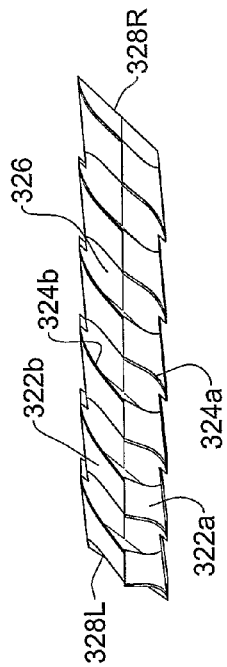
FIG. 6B is a schematic side view of the cutting insert shown in FIG. 6A.
Figure 6C:
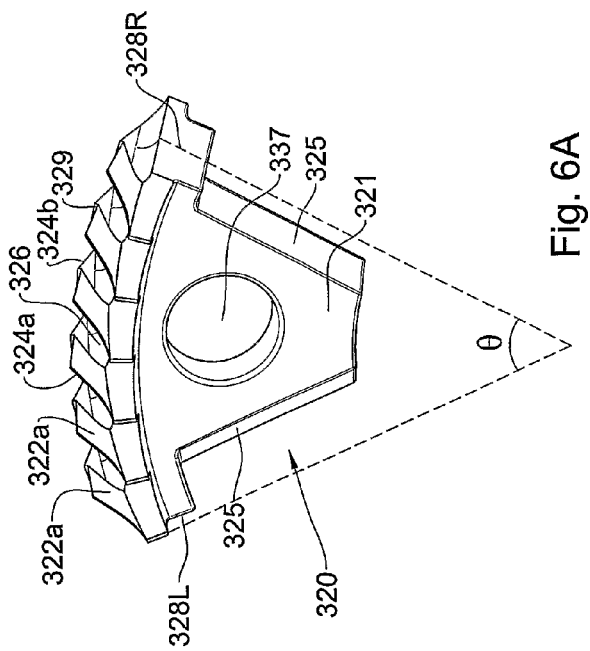
FIG. 6C is a schematic bottom view of the cutting insert shown in FIG. 6A.
Figure 6D:
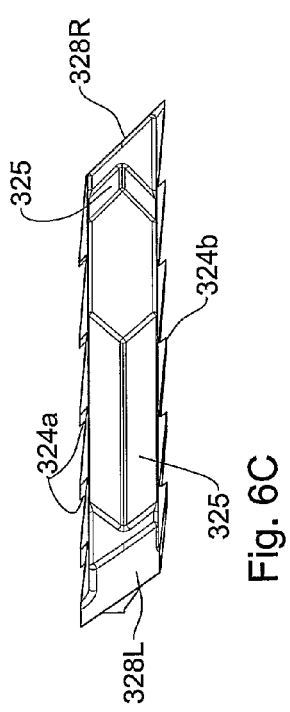
FIG. 6D is a schematic top view of the cutting insert shown in FIG. 6A.
Figure 6F:
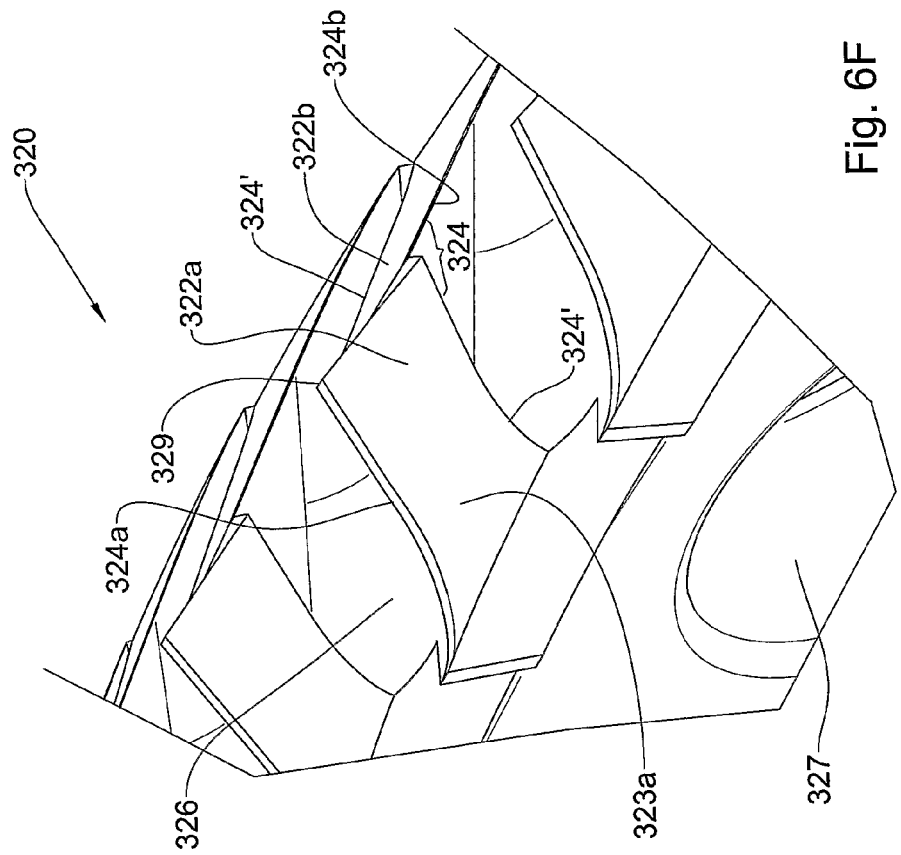
FIG. 6F is a schematic enlarged view of detail G shown in FIG. 6E.
Figure 6E:
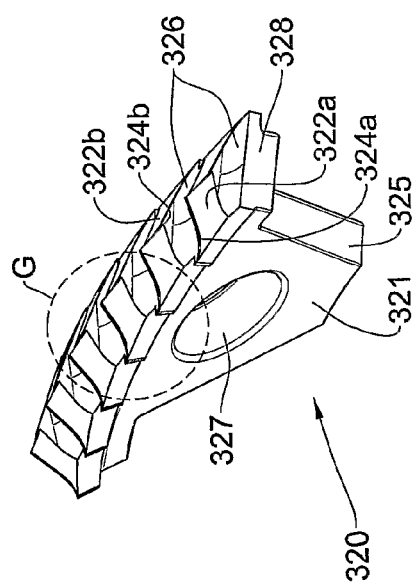
FIG. 6E is a schematic isometric view of the cutting insert shown in FIG. 6A.

Particular reference is now drawn to FIG. 6F, where it is observed that surfaces 323*a*, 323*b* defined between the respective cutting edges 324*a*, 324*b* and the idle edges 324' are slightly slanted, so as serve as a relief surface for the cutting teeth 322*a*, 322*b*. Thus, the surfaces 323*a* and 323*b* are also slanted with respect to one another, which may be clearly visible from the surface 329.

It should be appreciated that one of the advantages of the above disclosed example, is that a single cutting insert 320 may be replaced instead of replacing an entire cutting disc.

It should also be appreciated with respect to all of the previously discussed embodiments that since the cutting tools 1, 1', 1" and 1'" are adapted for the removal of a thin layer of material from a workpiece, their design allows them to remove a layer not thicker than L at a time. However, since the number of cutting teeth is increased, the resistance on each of the cutting teeth is reduced, allowing the cutting tool to operate faster and remove more material per time unit, providing all the advantages previously disclosed with respect to the first embodiment of the disclosed subject matter. It should also be appreciated that for reversible cutting inserts such as 120 and 320, the maximal thickness of a layer to be removed from a workpiece at a time is about L'.

In addition, with reference to FIGS. 7A and 7B, two cutting inserts generally designated as 420 and 520 respectively are shown, each comprising cutting teeth 422, 522 each having a cutting edge 424, 524, and chip evacuation channels 426, 526. It is observed that the cutting angle α of the first cutting insert 420 is greater than the angle β of the second cutting insert 520. In this particular example, α=45° and β=30°. Thus, the resistance applied to the cutting insert 520 by the workpiece WP (shown FIGS. 8A and 8B) is lower than the resistance applied to the cutting insert 420. Lowering the resistance allows using a greater number of cutting teeth in one cutting insert since the overall resistance applied to a single cutting tooth is lower.

In addition, with reference to FIGS. 8A and 8B, two cutting inserts generally designated as 620 and 720 respectively, are shown, each having a different circumferential profile. The profile of the cutting insert also plays a considerable role in the resistance applied to the cutting insert by the workpiece. Since, during a cutting operation the chip removed from the workpiece WP is urged perpendicularly to the cutting edge, a slanted cutting edge 624 as shown in the cutting insert 620 of FIG. 8A will urge the chip through the chip evacuation channel 626 faster than the rounded cutting edge 724 as shown in the cutting insert 720 of FIG. 8B. Changing the profile of the cutting edge also allows optimizing the number of cutting teeth per mm of diameter of the cutting tool.

In particular, according to a specific design of the disclosed subject matter there is provided a reversible cutting insert having a diameter $D_o$=32 mm, $D_i$≅29.2 mm (i.e. the depth of each chip evacuation channel is about 1.4 mm), n=32 (thirty two cutting teeth), L=3.5, and L'=1.75. In addition, the ratio between the circumferential width of the cutting tooth and the chip evacuation channel is about 4/3, such that the cutting tooth is 'thicker' than the chip evacuation channel adjacent thereto.

A cutting tool with a cutting insert as described above may be used such that the average thickness of a material layer removed from the workpiece WP is about 1.25 mm.

A cutting tool of the disclosed subject matter may operate such that every cutting tooth removes a chip of about 0.1÷0.3 mm thickness at a time. For the cutting tool above having 32 cutting teeth, this yields, on average (i.e. 0.15 mm), 5 mm per one full turn of the cutting tool. When using a standard revolution speed $V_R$ of about 1500 rpm, this yield a possible feed F of: 32×0.15×1500=7200 mm/min=7.2 m/min.

Thus, for example, when wanting to remove a thick layer of material from a workpiece (as opposed to a thin layer), e.g. 10 mm, instead of using a cutting tool able to remove 10 mm at once, it may be less time consuming and more cost efficient to use the cutting tool of the disclosed subject matter and removing eight layers of 1.25 mm.

Figure 9A:
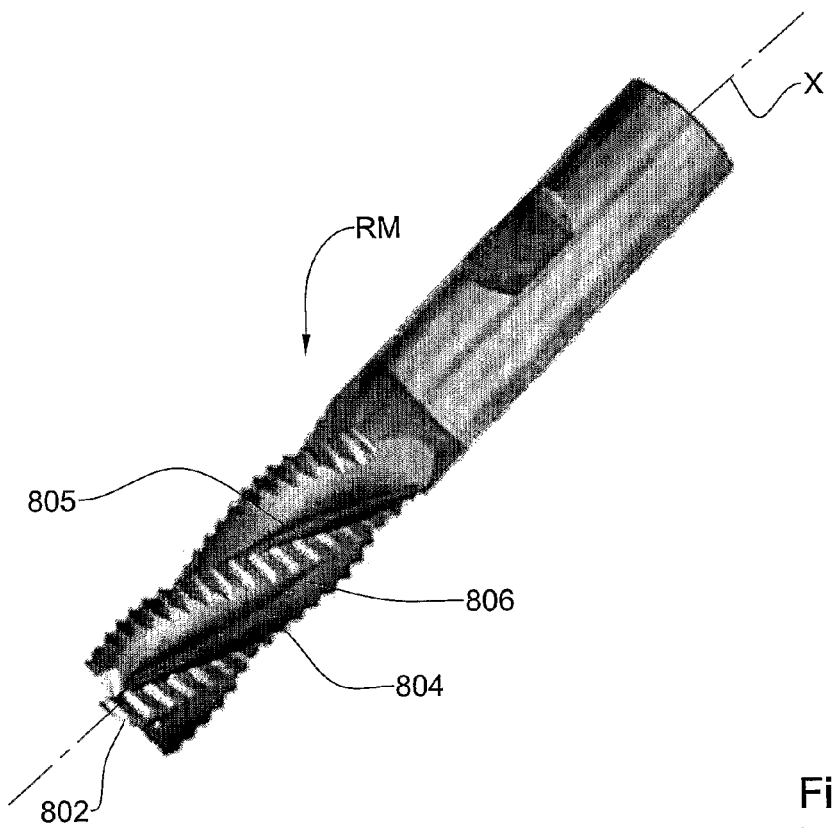
FIGS. 9A and 9B are schematic illustrations of a roughing mill and a chip splitter known from the art.
Figure 9B:
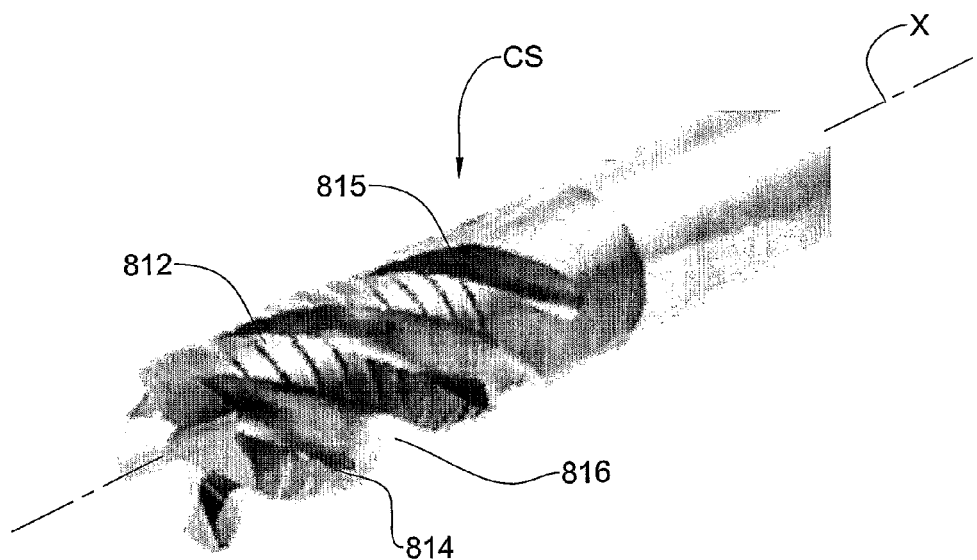

With attention being drawn now to FIGS. 9A and 9B, a rough milling tool generally designated as RM, and a chip splitting tool generally designated CS are shown, the use of which is known in common practice. Each of the tools RM, CS has a different shape of the cutting teeth thereof. In particular, the cutting teeth of the rough milling tool RM are each formed with grooves such that the cutting edge thereof is not straight but rather it is jagged, facilitating easier removal of chips from the workpiece. The chip splitting tool CS is also formed with grooves such that the cutting edge thereof is not continuous, but rather it is broken into segments, causing the splitting tool to produce shorter chips from the workpiece.

It should be understood that although the above disclosed tools RM and CS are designed for different purposes than that of the cutting tools of the disclosed subject matter 1, 1', 1'', and 1''', each of the tools of the disclosed subject matter may nonetheless be designed with cutting teeth having a cutting edge similar to the cutting tools RM and CS disclosed above, i.e. a jagged cutting edge or a cutting edge which is broken into segments.

Turning now to FIGS. 10A to 10F, a cutting tool according to another embodiment of the disclosed subject matter is shown, generally designated as 1010, and comprising a body 1012 extending along a central axis X, and having a cutting portion 1014 extending along two cutting paths CP, spirally (helically) extending along the circumference of the body 1012 from a distal end 1013d thereof towards a proximal end thereof 1013p.

Figure 15A:
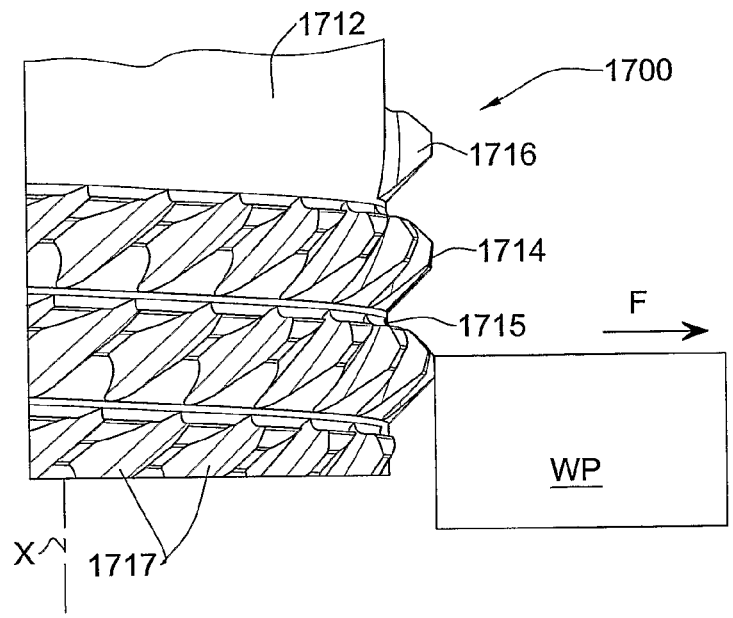
FIGS. 15A to 15G are schematic front views of various stages of a cutting operation performed using a cutting tool according to another embodiment of the disclosed subject matter.
Figure 15B:
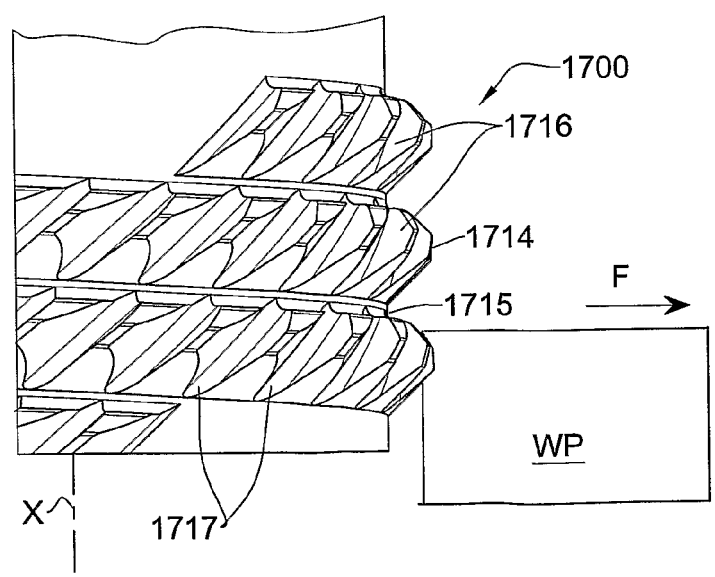
Figure 15C:
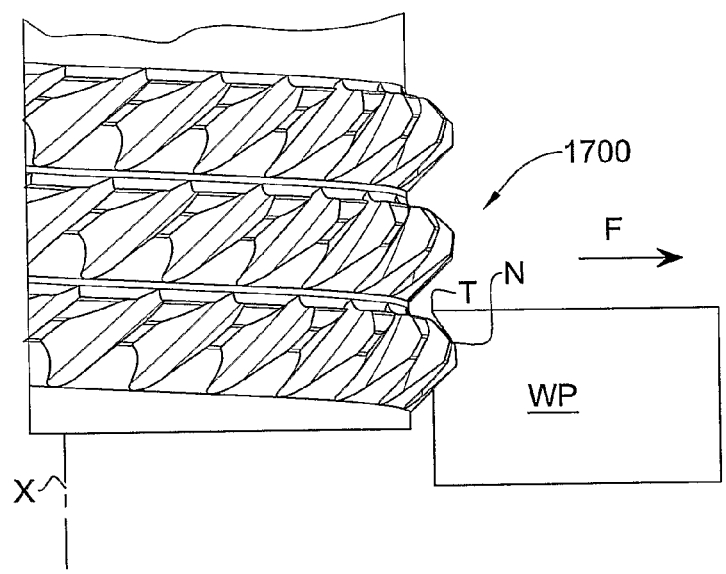
Figure 15D:
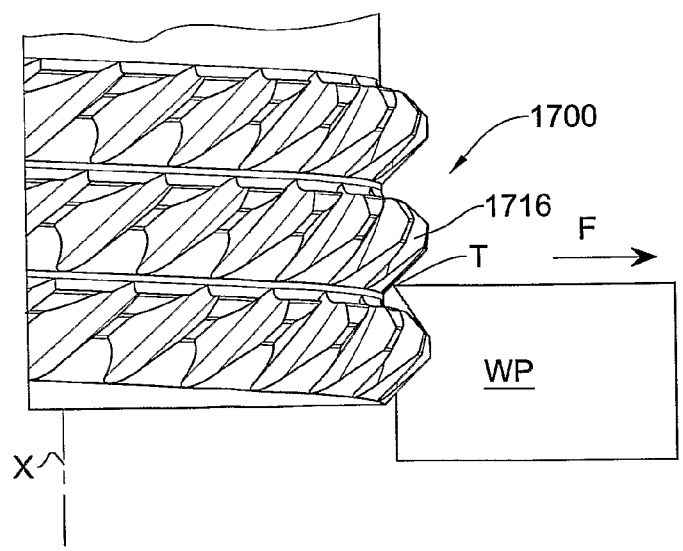

It is noted that the cutting tool is adapted to rotate in a CCW direction about the central axis X, and the spiral (helical) cutting portions 1014 extend in the same CCW direction. The spiral cutting portions 1014 have a negative inclination angle $\alpha \cong 8°$ with respect to the plane perpendicular to the central axis X. It is also noted, that between the two cutting portions 1014, along the axial direction, two spiral chip evacuation flutes 1015 are formed, adapted for evacuation of chips removed from the workpiece WP (shown FIGS. 15A and 15B).

Each cutting portion 1014 is formed with a plurality n of cutting teeth 1016 disposed along the cutting portion 1014, being equally spaced with respect to one another, such that there extends a chip evacuation channel 1017 between each two cutting teeth 1016. It is also noted that the cutting teeth 1016 are angled at a positive inclination angle $\beta \cong 45°$.

It should be noted that each turn (twist) of the spiral cutting portion 1014 about the central axis X contains a number n of cutting teeth 1016 which also yields to the formula $$n \geq \frac{3D}{4}$$

and in this particular example is equivalent to the diameter D of the cutting head 1000, and having an axial extension d which yields $$\frac{3D}{n} \geq d \geq \frac{3D}{2n}.$$

Figure 10A:
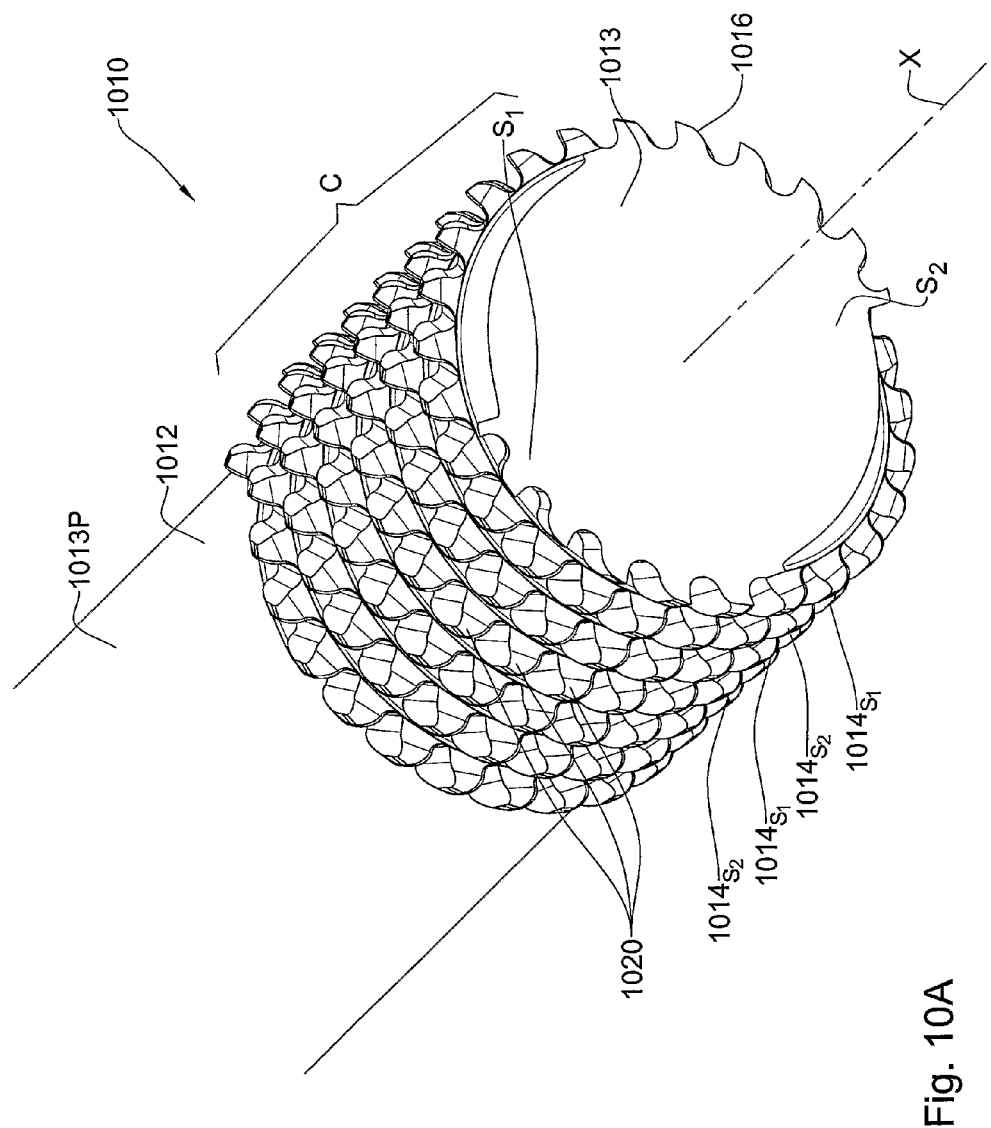
FIG. 10A is a schematic isometric view of a cutting tool according to a still further embodiment of the disclosed subject matter.
Figure 10B:
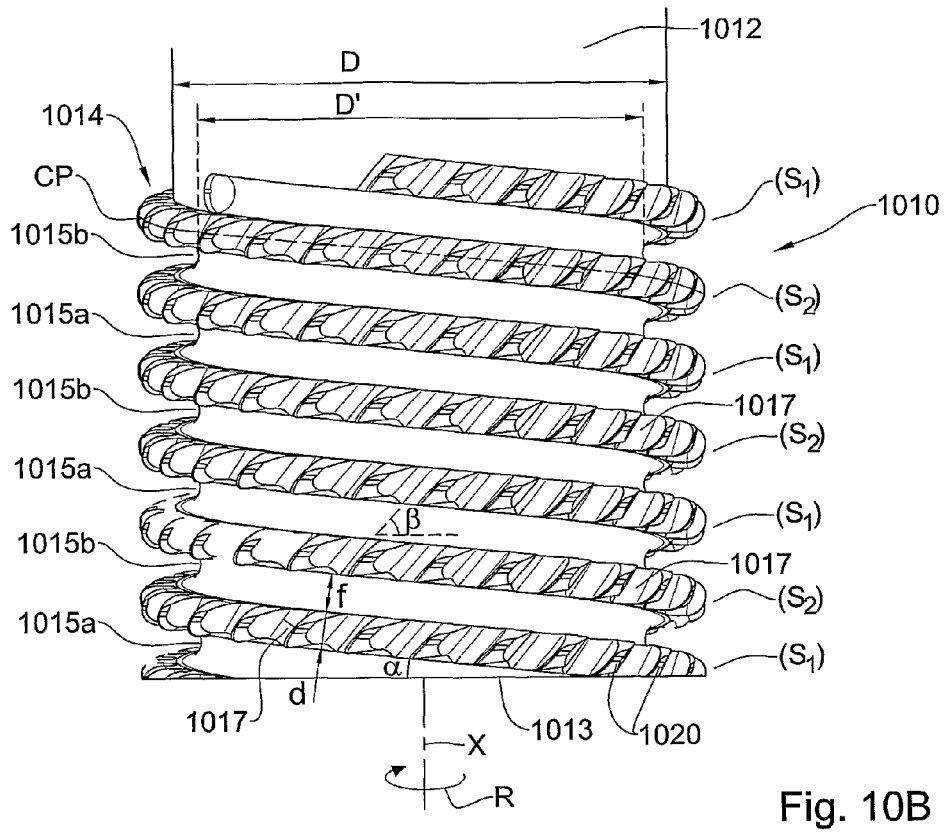
FIG. 10B is a schematic front view of the cutting tool shown in FIG. 10A.
Figure 10C:
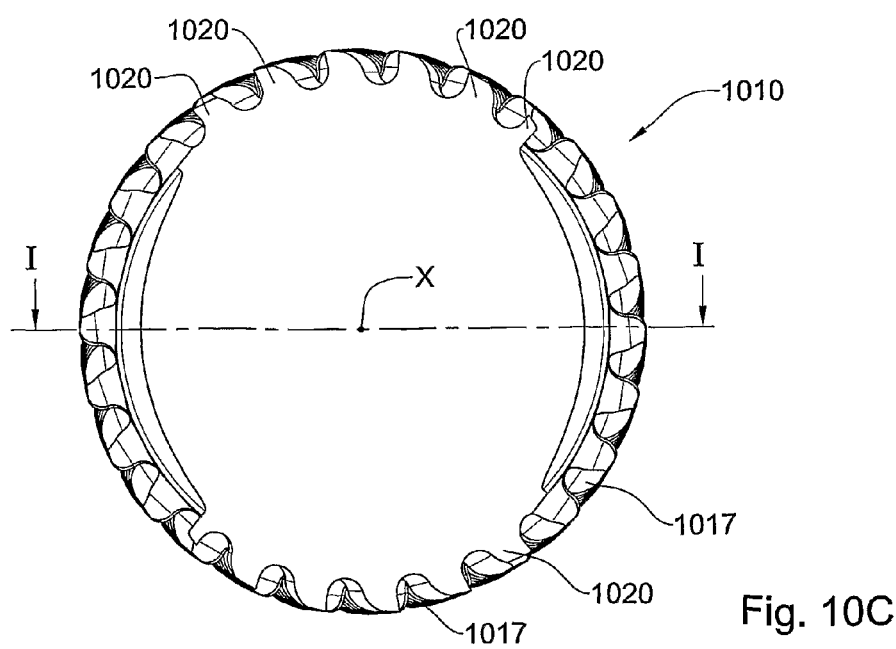
FIG. 10C is a schematic bottom view of the cutting too shown in FIG. 10A.
Figure 10D:
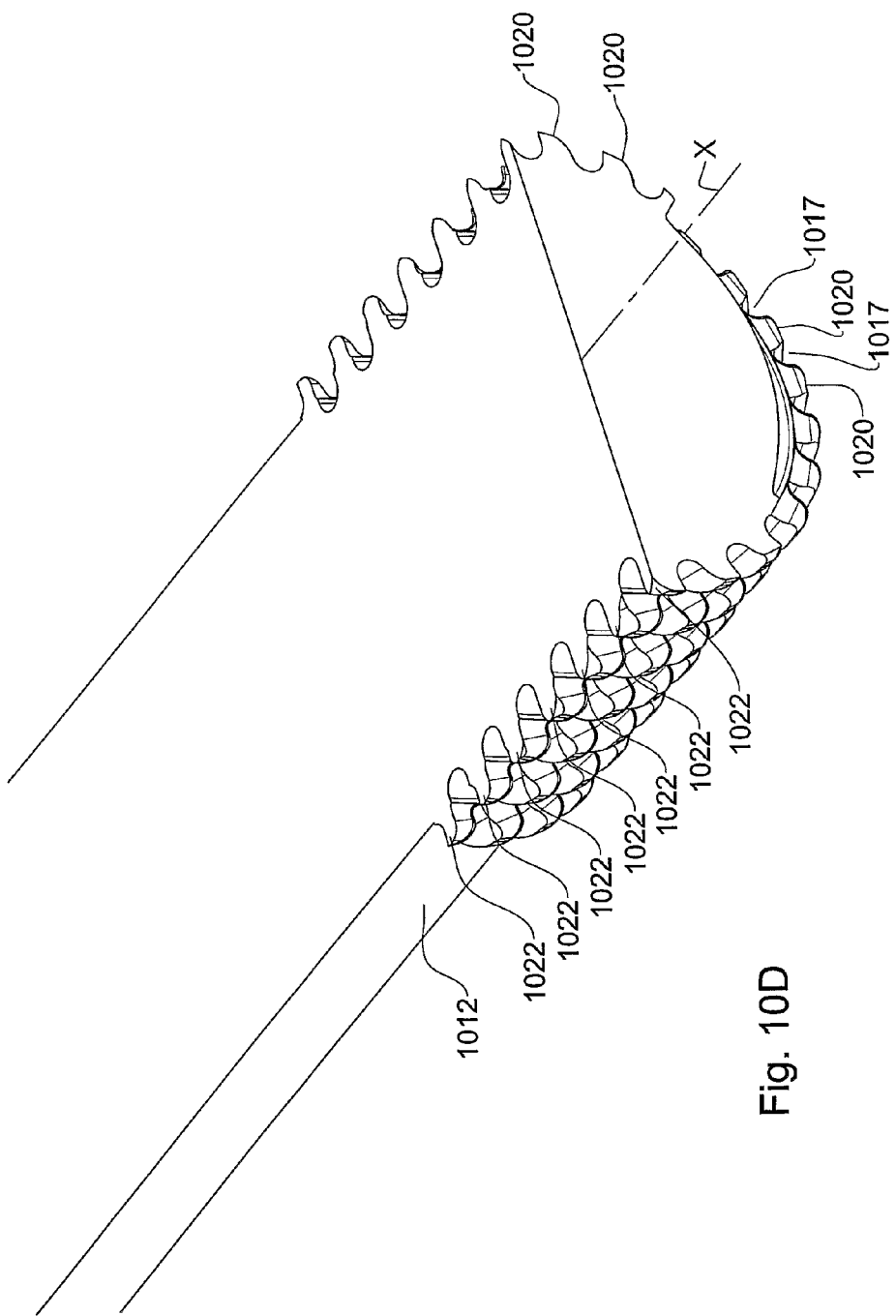
FIG. 10D is an isometric cross-section view of the cutting tool shown in FIG. 10A, taken along line I-I in FIG. 10C.
Figure 10E:
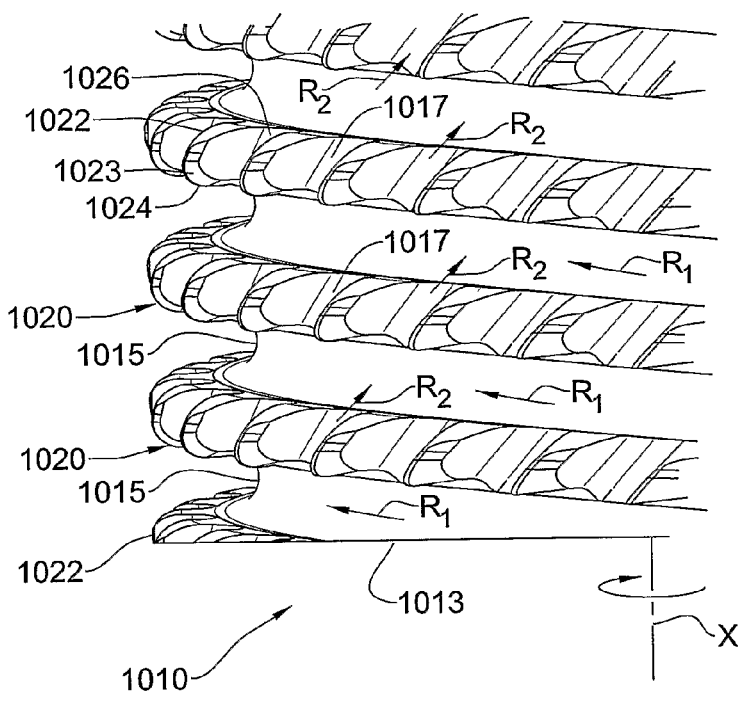
FIG. 10E is a schematic isometric enlarged view of an enlarged detail A, shown in FIG. 10B.
Figure 10F:
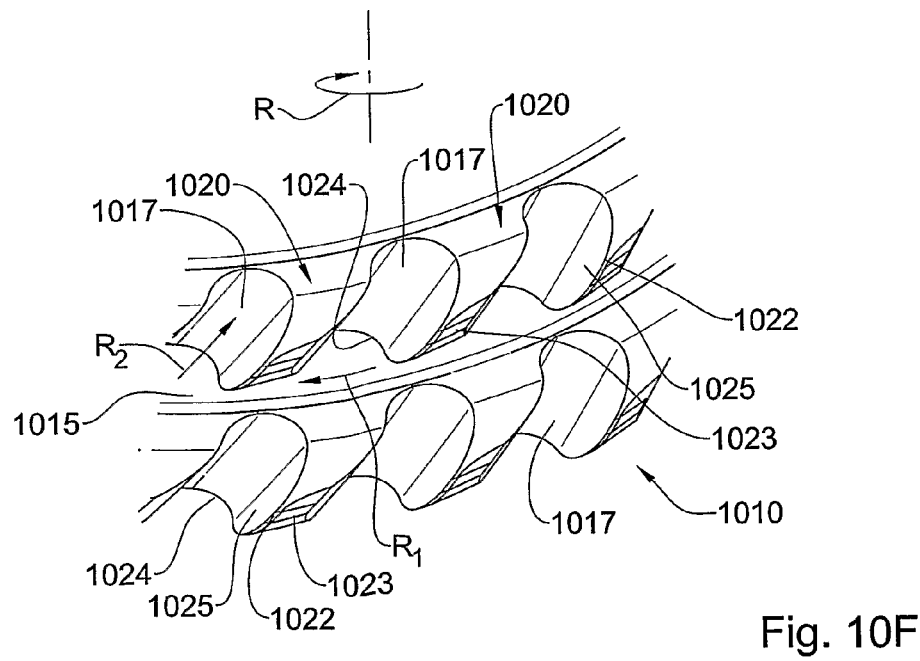
FIG. 10F is a schematic isometric enlarged view of a portion of the cutting tool shown in FIG. 10A.

Turning to FIGS. 10E and 10F, each cutting tooth 1016 is shown to have a cutting edge 1022 defined at the intersection between a rake surface 1025 and a relief surface 1023. The cutting edge 1022 extends generally in the axial direction and has a slight curvature. In addition, each cutting tooth 1016 is formed with a bottom cutting edge 1024 extending generally perpendicular to the central axis X, i.e. from the circumference of the cutting tool 1000 towards the central axis X.

In operation, the cutting head 1000 revolves about the central axis X in a CCW direction denoted by arrows R, such that when the cutting portions 1014 of the cutting head 1000 come in contact with the workpiece WP (shown in FIGS. 15A and 15B) both portions of the cutting edge 1022 and 1024 remove chips from the workpiece. When a chip is removed, it is first directed by the rake surface 1025 to pass through the chip evacuation channel 1017 between two adjacent cutting teeth 1016 along direction $R_2$. Thereafter, having passed the chip evacuation channel 1017, the chip is directed to the spiral chip evacuation flute 1015 where is begins to progress therealong in the direction of arrows $R_1$ until it is removed through the proximal portion of the cutting head 1000. It is noted that the spiral chip evacuation flute 1015 extends into the cutting tool 1000 itself, i.e. its inner diameter D' is smaller than the diameter D of the circumference of the cutting tool holder 1000.

It is important to note that designing a standard cutting tool having an increased number of cutting teeth/cutting edges (without a spiral chip evacuation channel) extending along the extension C so as to yield to the equation $$n \geq \frac{3D}{4}$$

is not feasible due to the great resistance to chip removal and relatively narrow and long chip evacuation channels. For this purpose, the spiral chip evacuation flutes 1015 are formed, so as to limit the axial extension of each cutting portion 1014, yielding to the formula $$\frac{3D}{n} \geq d \geq \frac{3D}{2n}.$$

Figure 11A:
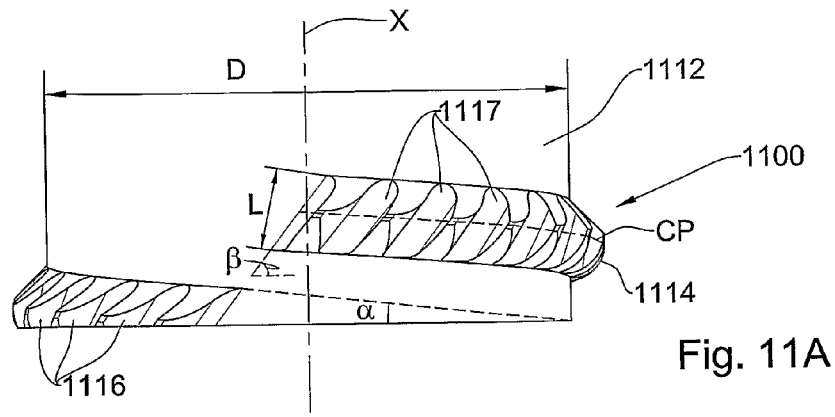
FIGS. 11A to 11C are schematic front views of three respective additional embodiments of a cutting head according to the disclosed subject matter.
Figure 11B:
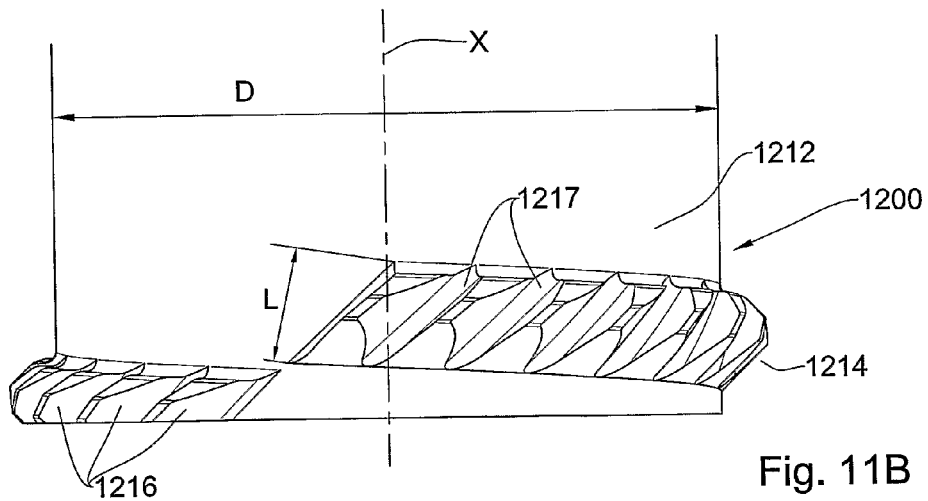
Figure 11C:
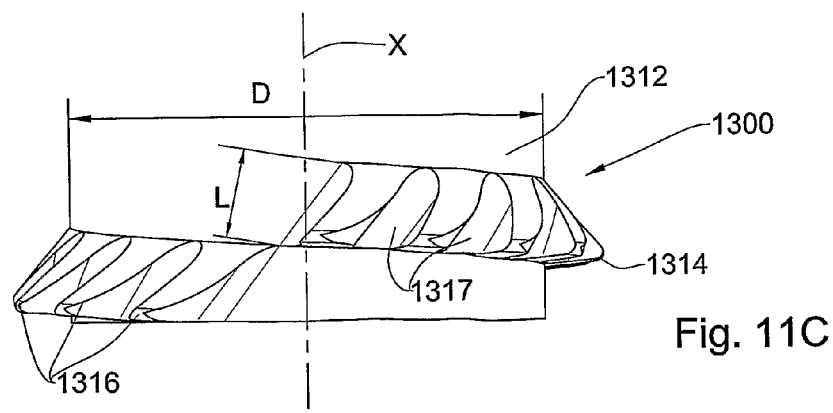
Figure 12A:
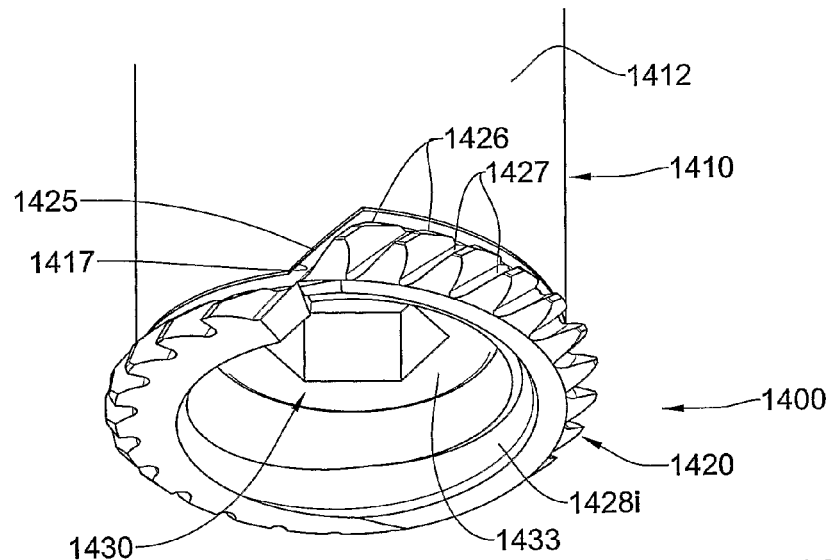
FIG. 12A is a schematic isometric view of another embodiment of a cutting tool according to the disclosed subject matter, comprising a cutting insert.
Figure 12B:
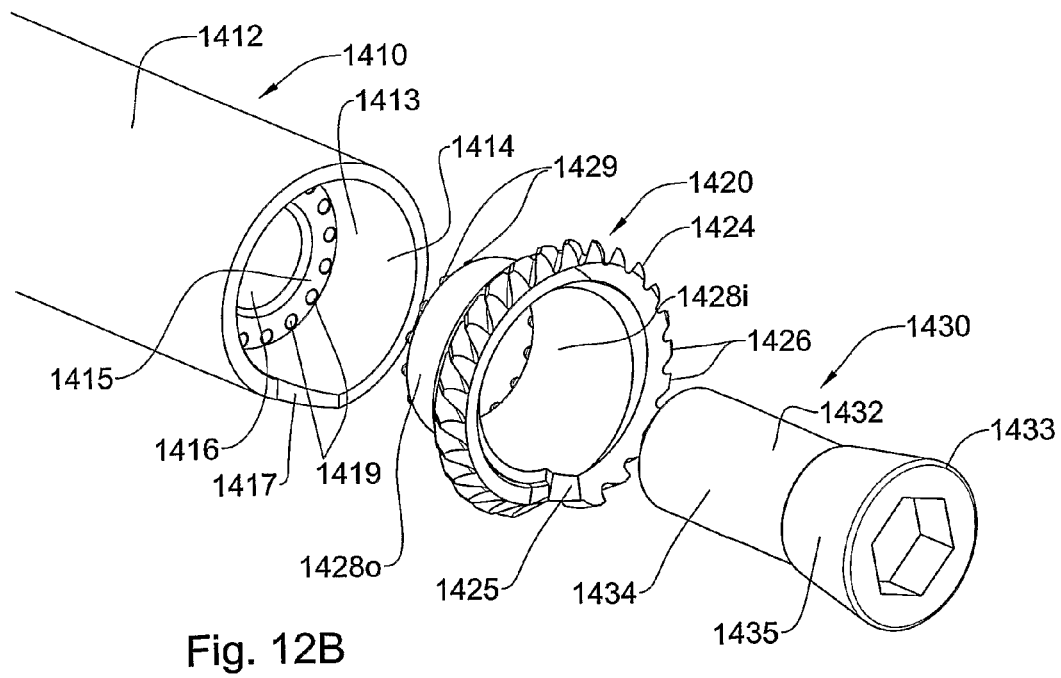
FIG. 12B is a schematic exploded isometric view of the cutting tool shown in FIG. 12A.
Figure 12E:
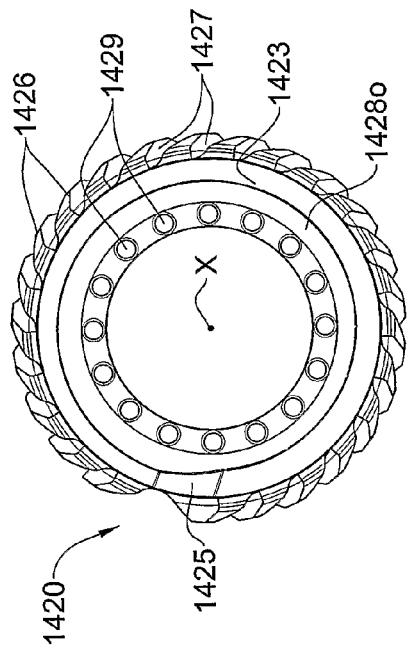
FIG. 12E is a schematic top view of the cutting insert shown in FIG. 12C.
Figure 12C:
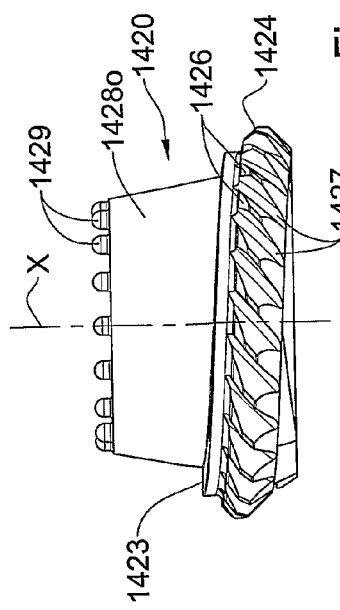
FIG. 12C is a schematic front view of the cutting insert shown in FIGS. 12A and 12B.
Figure 12D:
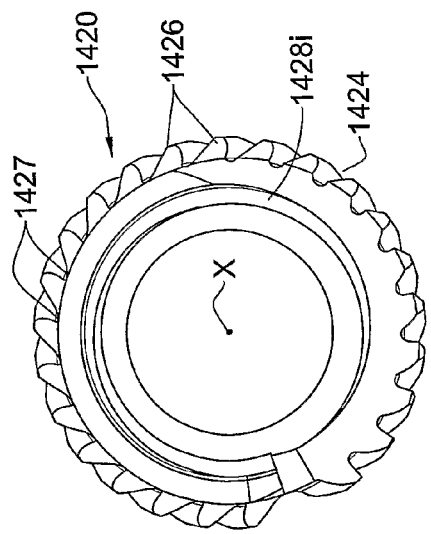
FIG. 12D is a schematic bottom view of the cutting insert shown in FIG. 12C.
Figure 12F:
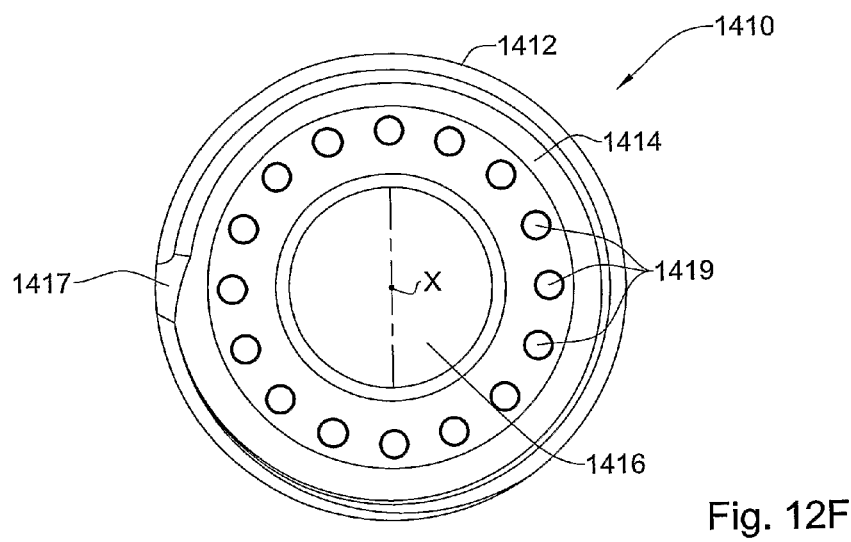
FIG. 12F is a schematic bottom view of a cutting tool holder shown in FIGS. 12A and 12B.
Figure 12G:
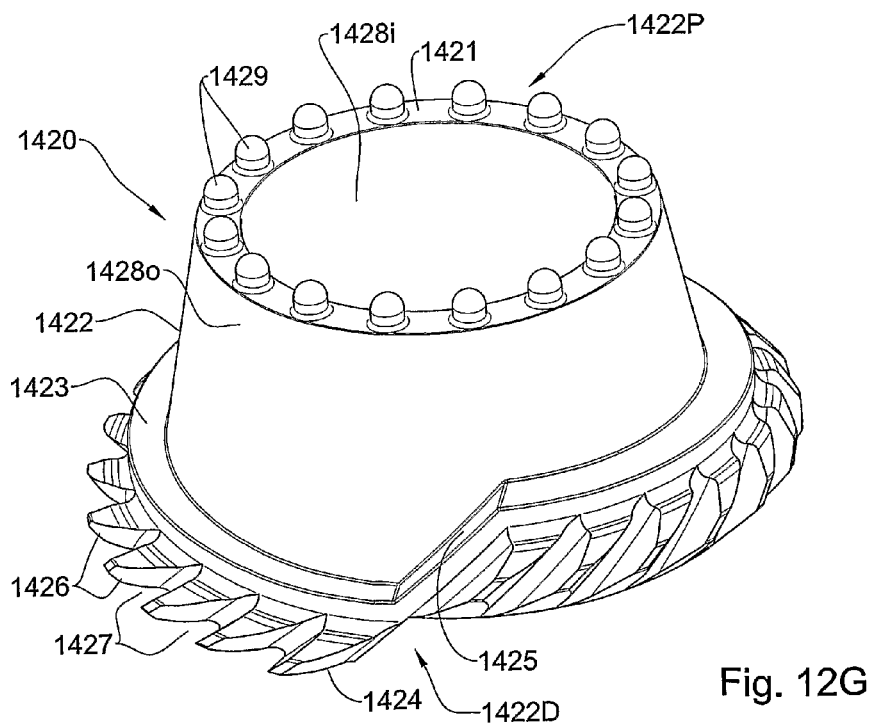
FIG. 12G is a schematic enlarged view of a portion of the cutting insert shown in FIG. 12C.

Attention is now drawn to FIGS. 11A through 11C, where three different embodiments of a cutting head are shown, respectively designated 1100, 1200 and 1300.

The cutting tool 1100 comprises a body 1112 having a diameter D and a central axis X, the body being formed with a cutting portion 1114 extending spirally (helically) along the circumference of the cutting head 1100, a single turn about the central axis X. The cutting portion 1114 is similar to the cutting portion 1014 shown in FIGS. 10A to 10F, and is similarly formed with a plurality n of cutting teeth 1116, spaced therebetween to form chip evacuation channels 1117.

The cutting portion 1114 has an inclination angle $\alpha \cong 7°$, and the chip evacuation channels 1117 have an inclination angle $\beta \cong 40°$. It is also noted that the extension L of the chip evacuation channels is such that it yields to the previously mentioned formula $$\frac{3D}{n} \geq L \geq \frac{3D}{2n}.$$

The cutting head 1100 operates similarly to the cutting head 1000 previously described, and in fact constitutes a combination between the cutting heads 1, 1', 1'' and 1''' and the cutting head 1000.

The cutting heads 1200 and 1300 have a similar design to the cutting head 1100, wherein designation numbers designating similar elements have been upped by 100 and 200 with respect to designation numbers of cutting head 1110. The three cutting heads 1100, 1200, 1300 defer from one another by the number of cutting teeth and cutting edges, and by the respective shape of the profile of their cutting teeth 1116, 1216, 1316. Cutting tool 1100 has a circular cutting profile, cutting tool 1200 has an angled cutting profile and the cutting tool 1300 has a straight cutting profile.

Turning now to FIGS. 12A to 12G, a cutting tool is shown generally designated as 1400 comprising a cutting tool holder 1410, a cutting insert 1420 and a fastening screw 1430.

The cutting tool holder 1410 comprises a body 1412 having a central axis X, and formed with a central conical cavity 1413 of adapted to receive the cutting insert 1420, the cavity 1413 being formed with an additional cavity portion 1416 of smaller diameter adapted to receive the fastening screw 1430.

The cutting tool holder 1410 is further formed with a securing rim 1415 extending perpendicularly to the central axis X thereof, and formed with a plurality of securing recesses 1419 disposed therealong adapted to receive corresponding securing protrusions 1429 of the cutting insert 1420.

The cutting insert 1420 comprises a conically formed hollow body 1422 having an outer surface $1428_O$ and an inner surface $1428_I$ extending between a proximal end $1422_P$ and a distal end $1422_D$ of the body 1422. The distal end $1422_D$ is formed with a circumferential rim 1423, and a spiral cutting portion 1424 extending along the circumferential rim 1423, and comprising a plurality n of cutting teeth 1426. The circumferential rim 1423 is also formed with an aligning slope 1425 adapted to align the cutting insert 1420 with respect to the cutting tool holder 1410.

The spiral cutting portion 1424 is similar to the spiral cutting portions 1014, 1114, 1214 and 1314 previously described.

The proximal end $1422_P$ of the body is formed with a securing rim 1421, having formed therealong a plurality of securing protrusions 1429 adapted to be received within corresponding recesses 1419 formed in the cutting tool holder 1410.

The fastening screw 1430 comprises a body 1432 formed with a conically shaped head 1433 and a threaded portion 1434.

In assembly, the cutting insert 1420 is inserted into the cavity 1413 of the cutting tool holder 1410 such that the securing protrusions 1429 of the cutting insert 1420 are received within the securing recesses 1419 of the cutting tool holder 1410. In this position, the outer surface $1428_O$ of the cutting insert 1420 is aligned with an inner surface 1414 of the cutting tool holder 1410.

Thereafter, the cutting insert 1420 is rotated about the central axis thereof such that the aligning slope 1425 is aligned with a corresponding aligning slope 1417 of the cutting tool holder 1410.

In this position, the threaded portion 1434 of the fastening screw 1430 is inserted through the hollow body 1422 of the cutting insert 1420 until it is received within the threaded portion 1416 of the cutting tool holder 1410. Upon fastening of the screw 1430, the external surface 1435 of the head 1433 of the fastening screw 1430 becomes flush with the inner surface $1428_I$ of the cutting insert 1420, thereby securing it in place.

Thus, after assembly, the cutting tool 1400 is adapted to operate in a manner similar to the cutting heads 1100, 1200 and 1300.

Turning now to FIGS. 13A to 13D, another embodiment of a cutting tool generally designated as 1500 is shown comprising a cutting tool holder 1510 similar to the cutting tool holder 1410, a first cutting insert 1520a similar to the cutting insert 1420, a second cutting insert 1520b, and a fastening screw 1530 similar to the fastening screw 1430.

The first cutting insert 1520a is of a similar design to the cutting insert 1520 previously described, however, it is further formed at a distal end thereof with a set of securing recesses 1529a' adapted to receive securing protrusions 1529b of the second cutting inserts 1520b, and disposed along a rim of the cutting insert 1520a at equally spaced distances from one another.

The second cutting insert 1520b is also of a similar design to the cutting insert 1420, however, it is formed with a plurality of securing protrusions 1529b disposed along a circumferential rim 1523b thereof, and adapted to be received within corresponding securing recesses 1529a' of the first cutting insert 1520a.

Figure 13A:
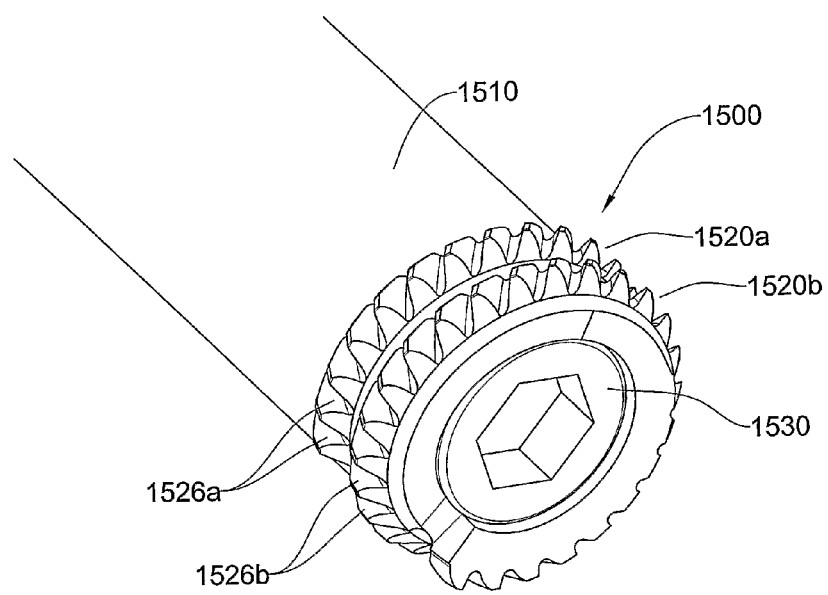
FIG. 13A is a schematic isometric view of a cutting tool according to still a further embodiment of the disclosed subject matter comprising two cutting inserts.
Figure 13B:
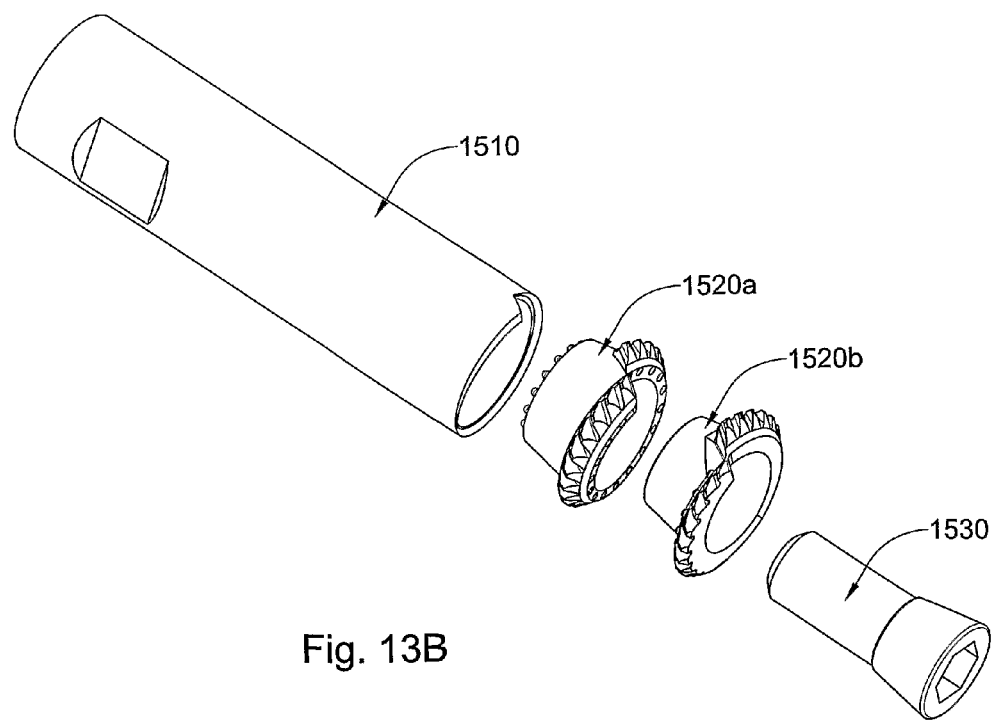
FIG. 13B is a schematic exploded view of the cutting tool shown in FIG. 13A.
Figure 13C:
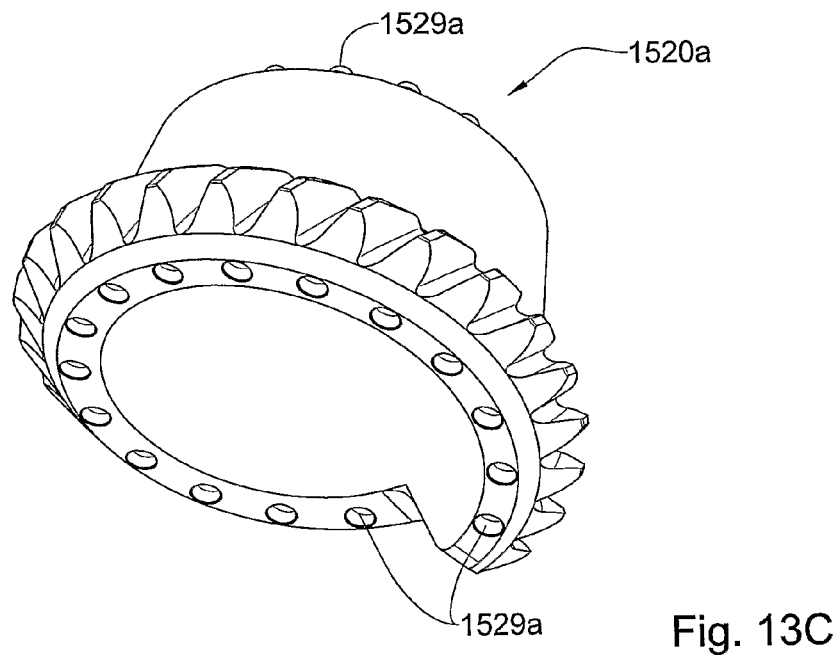
FIG. 13C is a schematic isometric view of one of the cutting inserts shown in FIGS. 13A and 13B.
Figure 13D:
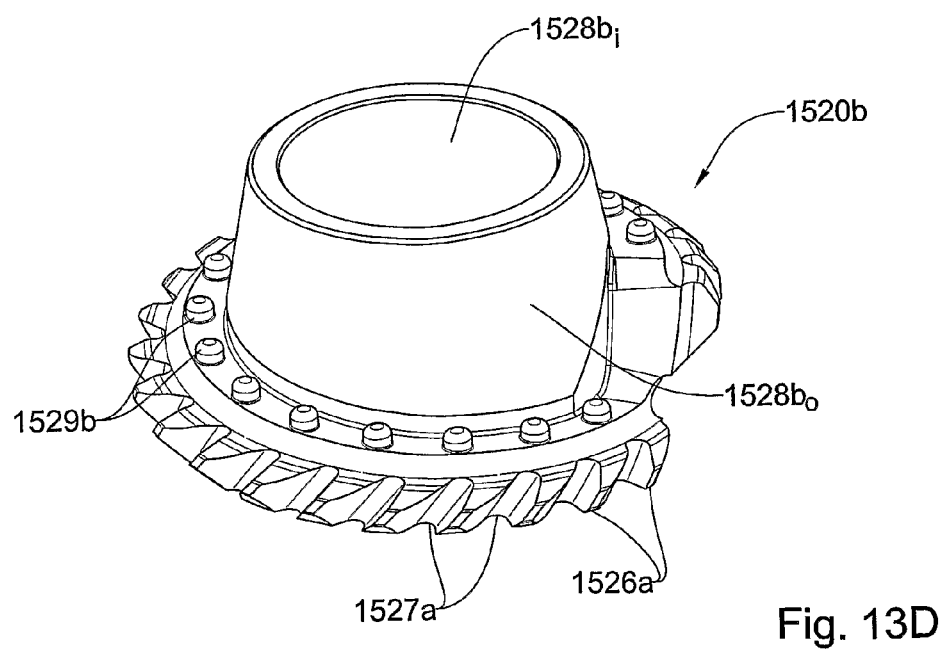
FIG. 13D is a schematic isometric view of the other cutting insert shown in FIGS. 13A and 13B.

Thus, in assembly, with particular reference to FIGS. 13A and 13B, the first cutting insert 1520a is received within the cutting tool holder 1510 in a manner equivalent to that in which the cutting insert 1420 is received within the cutting tool holder 1410. Thereafter, the second cutting insert 1520b is inserted into the first cutting insert 1520a, such that the securing protrusions 1529b are received within the recesses 1529a', and the outer surface $1528_O$b is flush against the inner surface $1528_I$a of the first cutting insert 1520.

In this position, the fastening screw 1530 is inserted through both first and second cutting insert 1520a, 1520b, to be threaded into the cutting tool holder 1510, thereby fastening both cutting inserts.

In this position, the cutting portion of the first cutting insert 1520a and the cutting portion of the second cutting insert 1520b form together an extended cutting portion, extending along two turns (twists) about the central axis X of the cutting tool 1500.

It should be appreciated that various designs may be used in accordance with the above example allowing the use of multiple cutting inserts to be employed with a single cutting tool holder 1510.

Figure 14A:
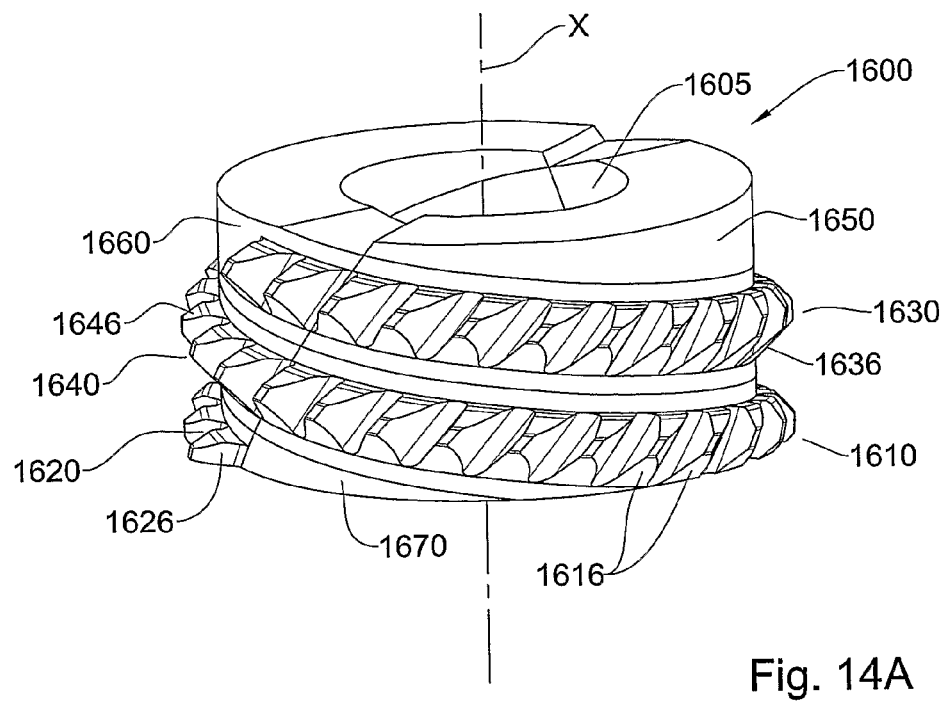
FIG. 14A is a schematic isometric view of a cutting insert assembly according to yet another aspect of the disclosed subject matter.
Figure 14B:
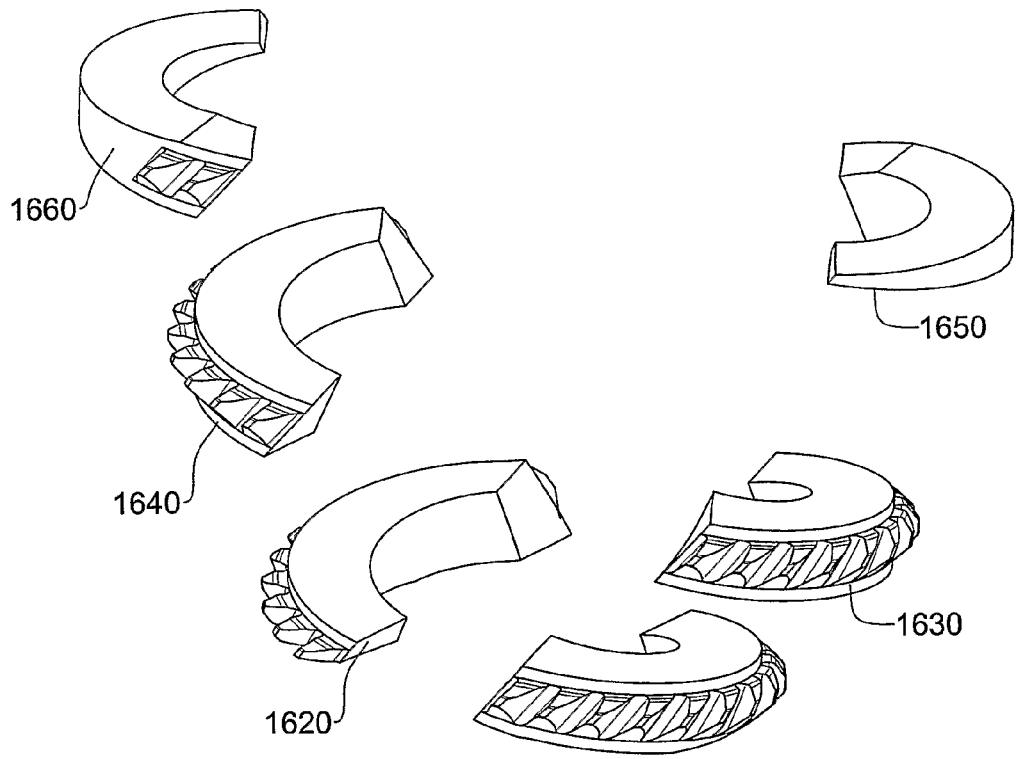
FIG. 14B is a schematic exploded isometric view of the cutting insert assembly shown in FIG. 14A.

Turning now to FIGS. 14A and 14B, another cutting insert assembly of a cutting tool head is shown, generally designated as 1600, comprising six cutting insert pieces 1610, 1620, 1630, 1640, 1650 and 1660, and two support pieces 1670.

Each cutting insert piece 1610, 1620, 1630, 1640, 1650 and 1660 is formed with a corresponding cutting portion 1614, 1624, 1634, 1644, 1654 and 1664, each comprising a plurality of cutting teeth 1616, 1626, 1636, 1646, 1656 and 1666.

The design is such that when assembled together, the cutting insert pieces 1610, 1620, 1630, 1640, 1650 and 1660 form a cutting insert assembly 1600 formed with two spiral cutting paths, each having a plurality of cutting teeth.

The cutting insert assembly 1600 is formed with a central hole 1605 adapted for receiving therethrough a fastening screw adapted to secure the cutting insert assembly 1600 to a cutting tool holder.

It is important to note that the pieces of the cutting insert assembly 1600 are held together and secured to one another due to the pressure applied thereto by the fastening screw (not shown).

In operation, the cutting insert assembly 1600 operates in a manner similar to the cutting tool 1000 previously described.

Turning now to FIGS. 15A to 15G, another cutting tool is shown generally designated 1700 and comprising a spiral cutting portion 1714 formed with a plurality of cutting teeth 1716, such that there extend chip evacuation channels 1717 between each two adjacent cutting teeth 1716, and a spiral chip evacuation flute 1715 extending along the circumference of the body 1712 of the cutting tool 1700.

Each cutting tooth 1716 is formed with a first cutting edge portion 1722, and a second cutting edge portion 1724, and two filleted corners 1726, 1728, also serving as cutting portions.

The cutting tool 1700 is of a diameter D=32 mm, and the spiral cutting portion 1714 is designed to have 24 teeth along each full 360° turn about the circumference of the cutting tool body 1712.

The inclination angel of each chip evacuation channel 1717 is β≅45° and its depth is about 2 mm, and the inclination angle of the spiral chip evacuation channel 1715 is α≅8°. According to this design, each two adjacent cutting teeth 1716 have an axial distance of about 0.2 mm between the cutting edges thereof.

According to the above design, the cutting tool 1700 is adapted to have a feed speed F of about 3 mm per turn of the cutting tool 1700, i.e. about 0.125 mm per tooth per turn, and can enter the workpiece WP to a depth of about 15 mm. Thus, for example, for a revolution speed of 1500 rpm yields an allowable feed of 75 mm per second, or 450 cm a minute.

In operation, the cutting tool 1700 rotates about the central axis X thereof while progressing to the right with a predetermined feed F. At first, only the cutting teeth 1716 of the second turn of the cutting path 1714 come in contact with the workpiece WP, so as to create a nook N in the workpiece WP. Thus, as may be more particularly observed in FIG. 15D, there is formed an angled surface S' with a tip T at the top end thereof.

Figure 15E:
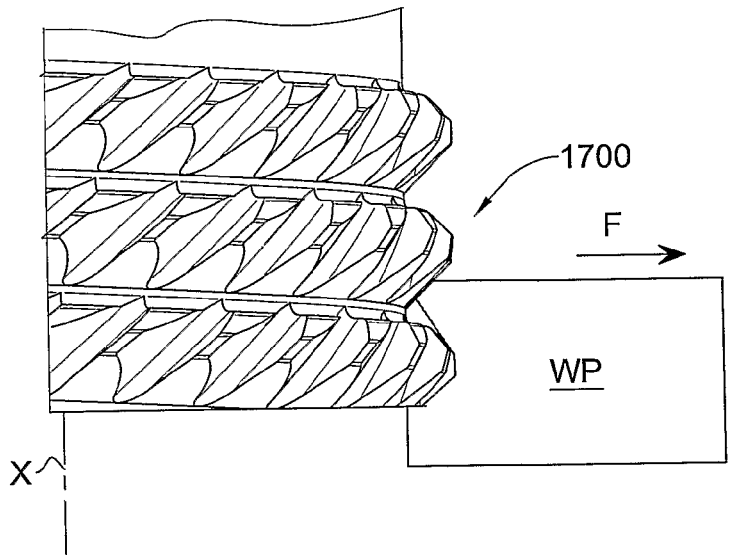
Figure 15F:
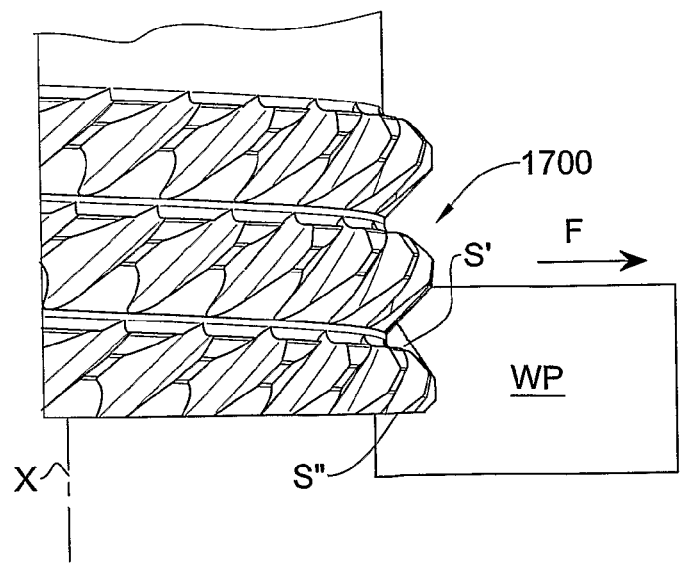
Figure 15G:
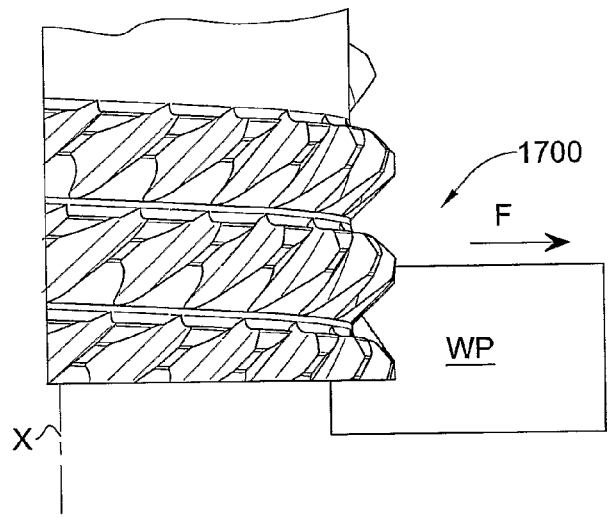

In the following stage of the cutting operation, as shown more clearly in FIGS. 15E to 15G, the second turn of the cutting path 1714 begins chipping away the tip T and while the cutting tool 1700 progresses in the feed direction F.

Figure 15H:
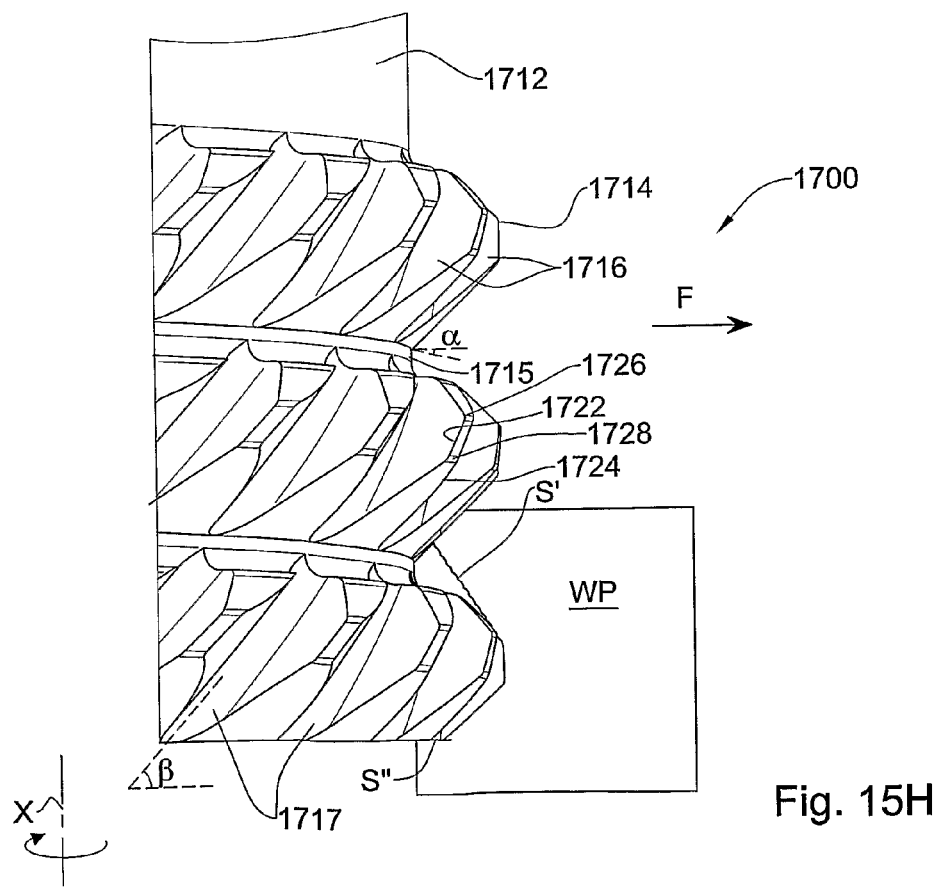
FIG. 15H is a schematic enlarged view of detail A shown in FIG. 15E.

With particular reference drawn to FIG. 15H, it is observed that during progress of the cutting tool 1700 in the feed direction F, the surface S' is always angled and is not smooth sue to the fillets 1726, 1728 of the cutting teeth 1716.

However, it is appreciated that once the cutting tool 1700 no longer progresses in the feed direction (i.e. F=0), and simply rotates in place about the central axis X thereof, the cutting tool 1700 with straighten the edge S', and leave a straight edge corresponding to the contour of the envelope of the cutting tool 1700 defined by those points of the cutting teeth most remote from the central axis X.

Figure 16A:
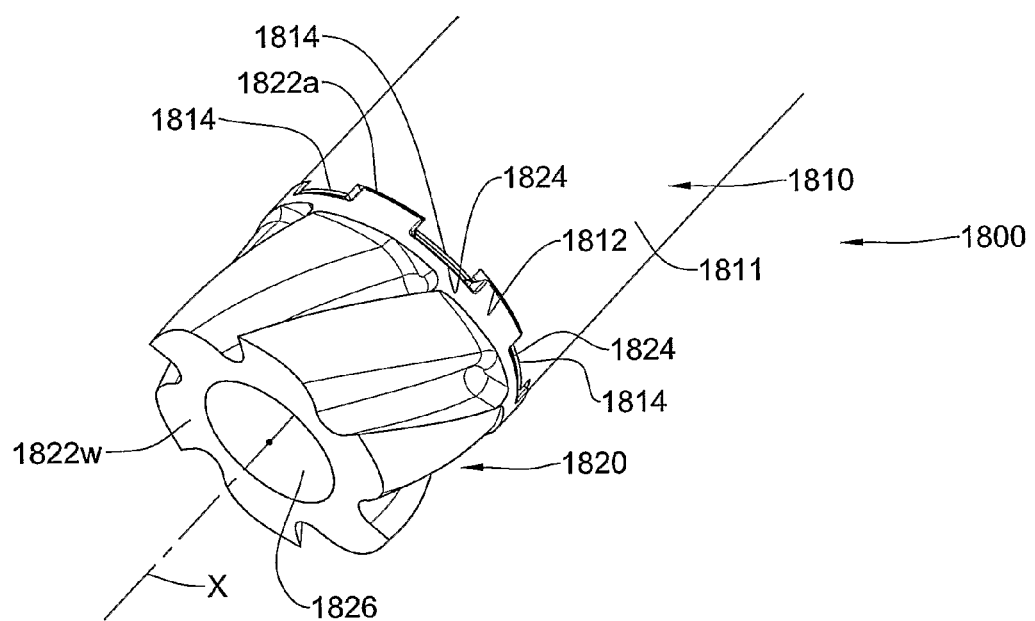
FIG. 16A is a schematic isometric view of a cutting insert formed with an attachment mechanism according to a specific embodiment of the disclosed subject matter.
Figure 16B:
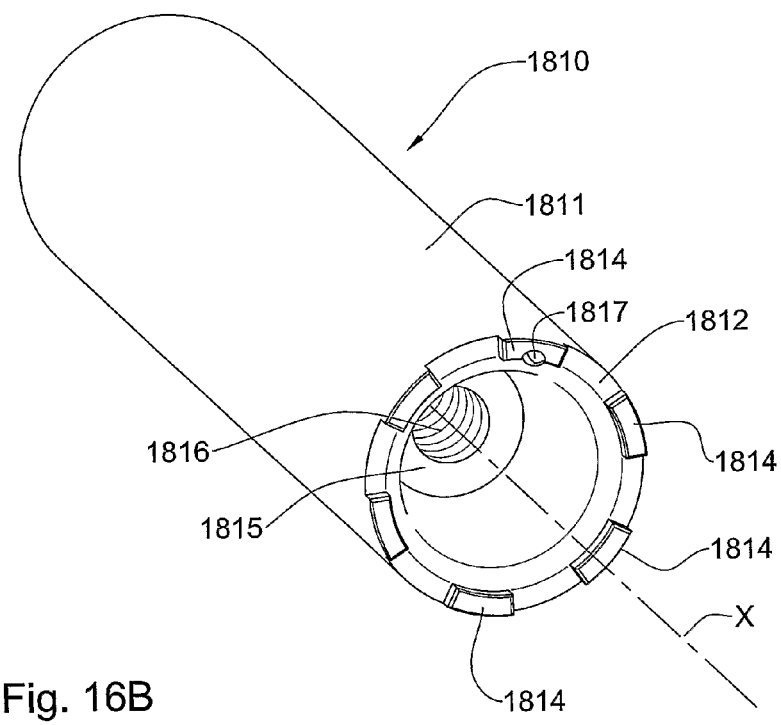
FIGS. 16B and 16C are respective schematic isometric views of the cutting tool holder and cutting insert shown in FIG. 16A.
Figure 16C:
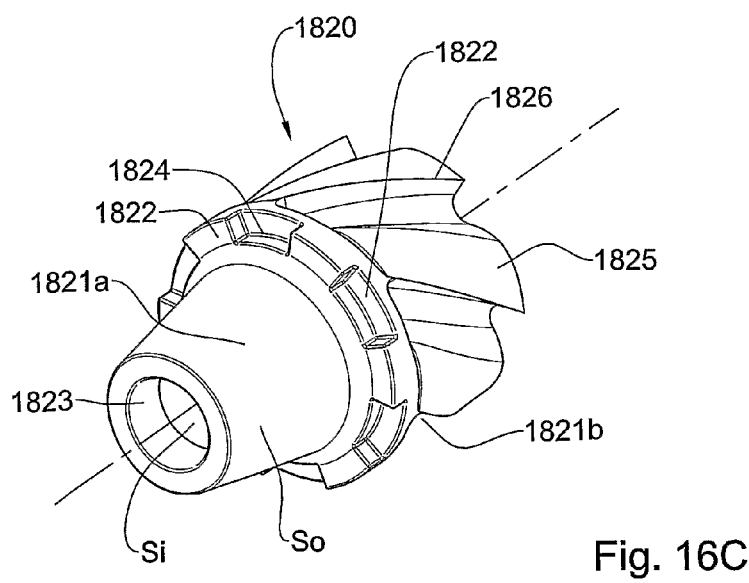

Turning now to FIGS. 16A to 16C, a cutting tool generally designated 1800 is shown comprising a cutting tool holder 1810, a cutting insert 1820 and a fastening screw 1830 (not seen).

The cutting tool holder 1810 has a body 1811 extending along a central axis X, and has a lip 1812 formed with protrusions 1814 thereon adapted for attachment of the cutting insert 1820 thereto. The cutting tool holder 1810 is further formed with a central channel 1815 adapted to accommodate a portion of the cutting insert 1820, and a screw attachment hole 1816 adapted for receiving therein the fastening screw 1830 adapted to secure the cutting insert 1820 to the cutting tool holder 1810.

The cutting insert 1820 is formed with an attachment portion 1821a and a cutting portion 1821b. The attachment portion 1821a has a conical form and is formed with a cavity 1823, thus having an inner surface $S_I$ and an outer surface $S_O$, and is adapted to receive therein the fastening screw 1830. The attachment portion 1821a also has a lip 1822 formed with recesses 1824 adapted to engage the cutting tool holder 1810. The cutting portion 1821b of the cutting insert 1820 is formed with cutting teeth 1825, each having a cutting edge 1826.

The cutting tool holder 1810 is formed with rectangular securing protrusions 1814 equally spaced about the central axis X of the cutting tool 1800 along a lip 1812 of the cutting tool holder 1810. The cutting insert 1820 is formed with a plurality of corresponding attachment recesses 1824 disposed about a lip 1822 of the cutting insert 1820, and adapted to receive the securing protrusions 1814, thereby preventing the cutting insert 1820 from rotating about the central axis X with respect to the cutting tool holder 1810. Such a design allows, inter alia, reducing the overall weight of the cutting insert.

The above design works in a manner similar to that discussed with respect to FIGS. 13A to 13D, with the difference being that in the present case, the securing protrusions are formed on the cutting tool holder and the attachment recesses are formed in the cutting insert.

It should be understood with respect to all the above described embodiments of the cutting tool that the depicting figures are schematic, and that the shape of the rake surface, relief surface and the chip evacuation channel between each two teeth are subject to various designs according to the specific use of the cutting tool, these designs being chosen by a designer and understood to a person skilled in the art.

Those skilled in the art to which this invention pertains will readily appreciate that numerous changes, variations, and modification can be made without departing from the scope of the invention, mutatis mutandis.

The invention claimed is:

1. A cutting portion of an integral cutting tool or of a cutting insert adapted for mounting onto a cutting tool holder to form a cutting tool, comprising:
    a plurality n of cutting edges, the cutting portion extending along a cutting path about a central axis, the cutting path passing through a point of each of the cutting edges which is at a maximal radial space R from the central axis, where D=2R and θ is the angular extension of the cutting path about the central axis, at any given point along the cutting portion, $$\frac{3D}{n} \geq L \geq \frac{3D}{2n},$$

where L is one of the following:
    i. the extension of the cutting portion in a direction substantially perpendicular to the cutting path; or
    ii. the extension of the cutting edges in a direction substantially perpendicular to the cutting path;
    wherein the cutting insert has a top face and a bottom face and at least one side wall extending therebetween, the cutting portion extending along at least a segment of the at least one side wall, and wherein the cutting insert has a central plane extending between the top face and the bottom face and substantially parallel thereto, the cutting insert including:
    a first cutting portion extending along the segment such that cutting edges thereof extend between the top face and the central plane;
    a second cutting portion including cutting edges extending between the bottom face and the central plane; and
    wherein the cutting insert is reversible about the central plane between a first position in which the first cutting portion is adapted for coming in contact with the workpiece and a second, reversed position in which the second cutting portion is adapted for coming in contact with the workpiece; and
    wherein two cutting inserts each of which is configured as the cutting insert are configured for being positioned one next to the other such that the top faces thereof are flush with one another, the cutting portions thereof coming in contact with one another to form a combined cutting portion with a greater angular extension about the central axis than each of the cutting portions of the cutting inserts.

2. The cutting portion according to claim 1, wherein, between each two neighboring cutting edges of the cutting portion there extends a chip evacuation channel, the cutting path extending along at least a sector of a circle.

3. The cutting portion according to claim 1, wherein between each two neighboring cutting edges of the cutting portion there extends a chip evacuation channel, the cutting path extending along at least a sector of a helix.

4. The cutting portion according to claim 3, wherein the cutting tool is adapted to revolve in a first direction about the central axis, the cutting edges of the cutting portion face in the first direction and the helix extends in the first direction about the central axis.

5. The cutting portion according to claim 4, wherein the inclination angle of the helix with respect to the central axis is less than about 45°.

6. The cutting portion according to claim 3, wherein the cutting tool is adapted to revolve in a first direction about the central axis, the cutting edges of the cutting portion face in the first direction and the helix extends in a second direction about the central axis which is opposite the first direction.

7. The cutting portion according to claim 6, wherein the inclination angle of the helix with respect to the central axis is greater than about 135°.

8. The cutting portion according to claim 1, wherein the cutting path extends more that about 360° about the central axis, forming more than one twist about the central axis.

9. The cutting portion of the cutting insert according to claim 1, wherein the cutting edges of the first cutting portion are facing in a CW direction with respect to the central axis while the cutting edges of the second cutting portion are facing in a CCW direction with respect to the central axis.

10. The cutting portion of the integral cutting tool according to claim 1, wherein the cutting tool comprises several cutting portions, the start points of the cutting path of each such cutting portion, being angularly offset with respect to one another.

11. The cutting portion of the cutting insert according to claim 1, wherein, the cutting insert is in the form of a hollow circular body defined about a central axis and having a central cavity, an inner surface and an outer surface, and being further formed with an attachment face adapted for attachment to a cutting tool holder and a work face, axially remote from the attachment face, on which the cutting portion is formed.

12. The cutting portion of the cutting insert according to claim 11, wherein the cutting insert is adapted for receiving within its cavity a similar additional cutting insert such that the inner surface of the cutting insert faces the outer surface of the additional cutting insert, and such that the cutting portion of the cutting insert and the cutting portion of the additional cutting insert form together a combined cutting portion of greater angular extension.

13. The cutting portion of the cutting insert according to claim 11, wherein the cavity is of a conical shape, and the cutting portion is formed on the wide end of the cone.

14. The cutting insert comprising the cutting portion according to claim 11, wherein the attachment face is formed with securing protrusions and the cutting tool holder is formed with recesses adapted to receive therein the securing protrusions, so as to prevent rotation of the cutting insert about the central axis with respect to the cutting tool holder during a cutting operation.

15. A cutting insert, comprising:
a top face;
a bottom face; and
at least one side wall extending between the top face and the bottom face;
wherein the cutting insert extends along at least a segment of the at least one side wall, the cutting insert has a central plane extending between the top face and the bottom face and substantially parallel thereto, the cutting insert including:
a first cutting portion extending along the segment such that cutting edges thereof extend between the top face and the central plane;
a second cutting portion including cutting edges extending between the bottom face and the central plane; and
wherein the cutting insert is reversible about the central plane between a first position in which the first cutting portion is adapted for coming in contact with the workpiece and a second, reversed position in which the second cutting portion is adapted for coming in contact with the workpiece; and
wherein two cutting inserts each of which is configured as the cutting insert are configured for being positioned one next to the other such that the top faces thereof are flush with one another, the cutting portions thereof coming in contact with one another to form a combined cutting portion with a greater angular extension about the central axis than each of the cutting portions of the cutting inserts.

16. The cutting insert according to claim 15, wherein the cutting edges of the first cutting portion are facing in a CW direction with respect to the central axis while the cutting edges of the second cutting portion are facing in a CCW direction with respect to the central axis.

* * * * *